(12) United States Patent
Lindoff et al.

(10) Patent No.: US 8,731,573 B2
(45) Date of Patent: May 20, 2014

(54) ALLOCATION OF PRIMARY AND SECONDARY SYNCHRONIZATION CODE SEQUENCES TO CELLS IN A WIRELESS COMMUNICATION SYSTEM

(75) Inventors: Bengt Lindoff, Bjärred (SE); Niklas Andgart, Södra Sandby (SE); Ari Kangas, Lidingö (SE); Anders Rosenqvist, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 372 days.

(21) Appl. No.: 13/319,301

(22) PCT Filed: May 8, 2009

(86) PCT No.: PCT/SE2009/050502
§ 371 (c)(1),
(2), (4) Date: Nov. 7, 2011

(87) PCT Pub. No.: WO2010/128908
PCT Pub. Date: Nov. 11, 2010

(65) Prior Publication Data
US 2012/0052869 A1   Mar. 1, 2012

(51) Int. Cl.
*H04W 72/00* (2009.01)
*H04W 4/00* (2009.01)

(52) U.S. Cl.
USPC ......... 455/450; 455/452.2; 370/329; 370/350

(58) Field of Classification Search
CPC .......... H04W 72/042; H04W 72/0406; H04W 72/04; H04W 72/0446; H04W 74/006; H04W 72/082; H04W 72/1231; H04W 72/044; H04W 72/1278; H04W 72/1289; H04W 72/085; H04W 72/00; H04W 72/0486; H04W 28/18; H04W 72/12
USPC ................ 455/450–452.2; 370/329–330, 350
See application file for complete search history.

(56) References Cited

U.S. PATENT DOCUMENTS 6,504,830 B1    1/2003  Ostberg et al.
2008/0291892 A1*  11/2008  Luo ............................... 370/350

FOREIGN PATENT DOCUMENTS

WO    2007/055531 A2    5/2007
WO    2008/144746 A1    11/2008

OTHER PUBLICATIONS

Tanno, M. et al. "Evolved UTRA—Physical Layer Overview." IEEE 8th Workshop on Signal Processing Advances in Wireless Communications, 2007 (SPAWC 2007), Helsinki, Finland, Jun. 17-20, 2007.

*Primary Examiner* — George Eng
*Assistant Examiner* — Nam Huynh
(74) *Attorney, Agent, or Firm* — Coats & Bennett, P.L.L.C.

(57) ABSTRACT

Allocation of cell IDs in a cellular communication system includes determining a candidate allocation pattern of primary and secondary synchronization signal sequences for a candidate set of two or more cells. A performance metric is applied to the candidate allocation pattern to ascertain a performance indicator for the candidate allocation pattern, wherein the performance indicator indicates a quality of positioning performance for the candidate set of two or more cells. Cell-specific positioning performance for each cell in the candidate set of cells can be considered to derive the performance indicator of the candidate allocation pattern. If the performance indicator indicates acceptable positioning performance, primary and secondary synchronization signal sequences are allocated to respective ones of base stations corresponding to the two or more cells in accordance with the candidate allocation pattern. Otherwise, the process is repeated for a different candidate allocation pattern.

57 Claims, 16 Drawing Sheets

= Cell in evaluation set

ALLOCATION OF PRIMARY AND SECONDARY SYNCHRONIZATION CODE SEQUENCES TO CELLS IN A WIRELESS COMMUNICATION SYSTEM

BACKGROUND

The present invention relates to cellular communication systems, and more particularly to techniques and apparatuses for allocating synchronization sequences ("codes") to cells in a cellular communication system.

To facilitate the following discussion, terminology and network configurations that comply with the Third Generation Long Term Evolution (LTE) standard are used herein because these are known and will be readily understandable to the person of ordinary skill in the art. However, the use of this terminology and these configurations is done solely for the purpose of example rather than limitation. The various inventive aspects to be described in this document are equally applicable in many different mobile communications systems complying with different standards.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high-capacity high-data rate system in existing radio spectrum, a new system has to be able to utilize a bandwidth of varying size. The LTE system has been developed for this purpose. It is a new flexible cellular system that can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to and exceeding 100 Mb/s will be supported for the largest bandwidth. However, it is expected that LTE will be used not only for high rate services, but also for low rate services like voice. Since LTE is designed for Transmission Control Protocol/Internet Protocol (TCP/IP), Voice over IP (VoIP) will likely be the service that carries speech.

FIG. 1 illustrates a mobile communication service area 101, such as an LTE system service area, that comprises a number of cells 103. User Equipment (UE) (e.g., the UE 105) located in a cell is served by an antenna in that cell. The antenna is coupled to a node in the communication system so that communication data can be routed between the UE and other equipment through the communication system.

A simplified cell planning diagram is depicted in FIG. 2. A core network (not shown) is connected to one or more evolved UTRAN Node Bs (eNodeB) (201-1, 201-2) (generally referred to by means of reference numeral 201). Each eNodeB 201 is capable of communicating with every other eNodeB 201 in the same network. As can be seen in FIG. 1, one eNodeB 201 connects to one or more antennas, 203-1, 203-2, . . . , 203-M (generally referred to by the reference numeral 203). The eNodeB 201 is a logical node handling the transmission and reception of a set of cells. Logically, the antennas of the cells belong to the eNodeB but they are not necessarily located at the same antenna site. Thus, one eNodeB 201 can be responsible for one or more cells. It is the ability of serving cells not transmitted from the same antenna site that makes a NodeB different compared to what in other types of systems are called a "Base Transceiver Station (BTS)", "Base Station (BS)", or "Radio Base Station (RBS)". However, in this specification the term "base station" is used as a generic term, rather than a system-specific term, to further emphasize that the invention is not limited to applications in only the specific exemplary systems.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval.

As illustrated in FIG. 4, the downlink subcarriers in the frequency domain are grouped into resource blocks, where each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c=12 \cdot N_{RB}+1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB-min}=6$ and upwards, corresponding to a nominal transmission bandwidth ranging from around 1 MHz up to well beyond 20 MHz. This allows for a very high degree of LTE bandwidth/spectrum flexibility, at least from a physical-layer-specification point-of-view.

FIGS. 5a and 5b illustrate the time-domain structure for LTE downlink transmission. Each 1 ms sub-frame 500 consists of two slots of length $T_{Slot}=0.5$ ms (=15360·$T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ μs (2048·$T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is 160·$T_S \approx 5.1$ μs for the first OFDM symbol of the slot, and 144·$T_S \approx 4.7$ μs for the remaining OFDM symbols.

FIG. 5b illustrates an extended cyclic prefix, which because of its longer size, allows only six OFDM symbols per slot to be communicated. The length of an extended cyclic prefix, $T_{CP-e}$, is 512·$T_S \approx 16.7$ μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of 12.7=84 resource elements for the case of normal cyclic prefix (illustrated in FIG. 4), and 12·6=72 resource elements for the case of the extended cyclic prefix (not shown).

Another important aspect of a terminal's operation is mobility, an aspect of which is cell search. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of WCDMA. To assist the terminal in this procedure, LTE provides a primary synchronization signal and a secondary synchronization signal on the downlink. This is illustrated in FIG. 6, which illustrates the structure of the radio interface of an LTE system. The physical layer of an LTE system includes a generic radio frame 600 having a duration of 10 ms. FIG. 6 illustrates one such frame 600 for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. In addition to the synchronization signals, part of the operation of the cell search procedure also exploits reference signals that are transmitted at known locations in the transmitted signal.

In the first step of the cell-search procedure, the mobile terminal uses the primary synchronization signal to find the timing of the 5 ms slots. Note that the primary synchronization signal is transmitted twice in each frame. One reason for this is to simplify handover of a call from, for example, a GSM system, to an LTE system. However, transmitting the primary synchronization signal twice per frame creates an ambiguity in that it is not possible to know whether the detected Primary Synchronization Signal is associated with slot #0 or slot #5 (see FIG. 6). Accordingly, at this point of the cell-search procedure, there is a 5 ms ambiguity regarding the frame timing.

In many cases, the timing in multiple cells is synchronized such that the frame start in neighboring cells coincides in time. One reason for this is to enable MBSFN operation. However, synchronous operation of neighboring cells also results in the transmission of the primary synchronization signals in the different cells occurring at the same time. Channel estimation based on the primary synchronization signal will therefore reflect the composite channel from all such cells if the same primary synchronization signal is used in those cells. For coherent demodulation of the second synchronization signal, which is different in different cells, an estimate of the channel from the cell of interest is required, not an estimate of the composite channel from all cells. Therefore, LTE systems support multiple (presently three) sequences for the primary synchronization signals. To enable coherent reception of a particular cell's signals in a deployment with time-synchronized cells, neighboring cells are permitted to use different primary synchronization sequences to alleviate the channel estimation problem described above. If there is a one-to-one mapping between the primary synchronization signal used in a cell and the identity within a cell identity group, the identity within the cell identity group can also be determined in the first step.

In the next step, the terminal detects the cell identity group and determines the frame timing. This is done by observing pairs of slots in which the secondary synchronization signal is transmitted. To distinguish between secondary synchronization signals located in subframe #0 and subframe #5, the secondary synchronization signals are constructed in the form $(S_1, S_2)$. If $(S_1, S_2)$ is an allowable pair of sequences, where $S_1$ and $S_2$ represent the secondary synchronization signal in subframes #0 and #5, respectively, the reverse pair $(S_2, S_1)$ is not a valid sequence pair. By exploiting this property, the terminal can resolve the 5 ms timing ambiguity that resulted from the first step in the cell search procedure, and determine the frame timing. Furthermore, as each combination $(S_1, S_2)$ represents a particular one of the cell groups, the cell group identity is also obtained from the second cell search step. The identity of the cell than can be used to determine the reference (or pilot) signal sequence and its allocation in the time-frequency grid.

The synchronization signals occupy 62 resource elements in the center of the allocated bandwidth. Five resource elements on either side of the 62 resource elements are set to zero, making a total of 72 resource elements in which the synchronization signals can be found during subframes #0 and #5 as described above. To distinguish between the secondary synchronization signal $S_1$ and the secondary synchronization signal $S_2$, each is created as a function of a pair of sequences $\tilde{S}_i$, $\tilde{S}_j$. That is, $S_1 = f(\tilde{S}_1, \tilde{S}_2)$ and $S_2 = f_2(\tilde{S}_1, \tilde{S}_2)$, as illustrated in FIG. 7a. Each of the sequences: $\tilde{S}_i$, $\tilde{S}_j$, is one of 31 different M-sequences, which is essentially a certain pn-sequence.

In LTE, the function for deriving $S_1$ and $S_2$ is implemented in the frequency domain by transmitting the sequences $\tilde{S}_i$ and $\tilde{S}_j$ simultaneously by means of interleaving. For example, given two sets of frequencies that are interleaved with one another, transmission of the symbol $S_1$ can be performed by transmitting the sequence $\tilde{S}_i$ in a "lower" one of the sets of interleaved frequencies and transmitting the sequence $\tilde{S}_j$ in a "higher" one of the sets of frequencies. (Here, the words "higher" and "lower" do not refer to the sets of frequencies as a single contiguous group, but rather to pairs of resource elements associated with the interleaved frequencies, so that one resource element associated with $\tilde{S}_i$, is on a lower frequency than the neighboring resource element associated with $\tilde{S}_j$.) Transmission of the symbol $S_2$ is the opposite, with the sequence $\tilde{S}_j$ being transmitted in a lower one of the sets of frequencies and the sequence $\tilde{S}_i$ being transmitted in a higher one of the sets of frequencies. This arrangement is illustrated in FIG. 7b. (To simplify the diagram, the unused DC carrier is not shown in FIG. 7b.)

A UE preferably includes a look-up table that associates each sequence pair and ordering with a cell group identifier and frame timing information (i.e., whether the ordering of the sequence pair indicates sub-frame 0 or sub-frame 5), so that the UE can easily identify the cell group and frame timing.

Once the cell search procedure is complete, the terminal receives the system information to obtain the remaining parameters (e.g., the transmission bandwidth used in the cell) necessary to communicate with this cell. This broadcast information is transmitted on the BCH transport channel.

The secondary synchronization signals can also be used for purposes other than identifying frame timing cell groups. For example, these signals are useful for assisting positioning services to determine a geographical position of a mobile terminal. The possibility of determining the position of a mobile device has enabled application developers and wireless network operators to provide location based, and location aware, services. Examples of such services include guiding systems, shopping assistance, friend finder, presence services, community and communication services and other information services giving the mobile user information about their surroundings.

In addition to the commercial services, governments in several countries require network operators to be able to determine the position of an emergency call. For instance, governmental regulations in the USA (FCC E911) require that it must be possible to determine the position of a certain percentage of all emergency calls. The requirements make no difference between indoor and outdoor environments.

The position estimation can be achieved by means of positioning systems, (e.g. Global Positioning System (GPS)-based methods like Assisted-GPS (A-GPS)). Position estimation can also be performed using the wireless network itself. Methods using the wireless network can be grouped into two main types. The first type comprises methods that are based on the radio cell to which a mobile terminal is attached (e.g. by using Cell-ID or a combination of cell-ID and Timing Advance (TA) information). Here the primary and secondary synchronization signals become relevant. Since each neighboring cell has a unique primary and secondary synchronization signal combination, these signals can be used as a kind of pilot signal to determine the cell timing for a respective cell.

WO 08/144,746 describes an approach for allocating primary synchronization signal and secondary synchronization signal sequences to cells in an LTE system. However, nothing in the disclosed technique is particularly helpful with respect to the quality (e.g., accuracy) of positioning system performance.

It is therefore desired to provide methods and apparatuses that facilitate the use of secondary synchronization signals (and their equivalent in other systems) to enhance the performance of services such as those utilizing positioning systems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters are provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in methods and apparatus for operating two or more base stations that serve respective cells in a cellular communication system. Such operation involves determining a candidate allocation pattern of a plurality of primary and secondary synchronization signal sequences for a candidate set of two or more cells that includes the cells served by the base stations. A performance metric is applied to the candidate allocation pattern to ascertain a performance indicator for the candidate allocation pattern, wherein the performance indicator indicates a quality of positioning performance for the candidate set of two or more cells. If the performance indicator satisfies a predetermined relationship with a threshold performance value for the candidate set of two or more cells, then the plurality of primary and secondary synchronization signal sequences are supplied to respective ones of base stations corresponding to the two or more cells in accordance with the candidate allocation pattern, and the two or more base stations are caused to transmit the supplied primary and secondary synchronization sequences. However, if the performance indicator does not satisfy the predetermined relationship with the threshold performance value for the candidate set of two or more cells, then the candidate allocation pattern of primary and secondary synchronization signal sequences is changed for the candidate set of two or more cells that include the cells served by the base stations, and the technique is repeated.

In an aspect of some embodiments consistent with the invention, each secondary synchronization signal sequence comprises a first sequence and a second sequence; and applying the performance metric to the candidate allocation pattern comprises ascertaining whether any two cells in the candidate set of two or more cells have been allocated a same primary synchronization signal sequence and a same first sequence and/or whether any two cells in the candidate set of two or more cells have been allocated a same primary synchronization signal sequence and a same second sequence.

In an aspect of some embodiments consistent with the invention, applying the performance metric to the candidate allocation pattern comprises ascertaining a degree of correlation between one or both of the primary and secondary synchronization signal sequences of one of the cells in the candidate set of cells and a corresponding one or both of the primary and secondary synchronization signal sequences of another one of the cells in the candidate set of cells. The more the correlation between adjacent/neighboring cells, the poorer the positioning performance. In some embodiments, individual correlation results (cell specific performance indicators) between pairs of cells in the candidate set of cells are ascertained. A correlation result exceeding a predefined threshold can be considered a "collision" that is indicative of poor positioning performance within a cell. A count of the number of "collisions" within the candidate set of cells can be a measure of expected positioning performance achievable by means of the candidate allocation pattern. Expected positioning performance within a cell can be estimated, for example, based on a "best" location within the cell. Alternatively, positioning performance within a cell can be estimated at a number of different locations within a cell, and the poorest one taken as a measure of expected positioning performance.

In another aspect of embodiments consistent with the invention, cell-specific performance indicators can first be weighted in accordance with a number of alternative weighting functions prior to being combined to derive the performance indicator. Weighting can be performed at the cell level, for example to give greater or lesser importance to some performance metrics relative to others and/or to give greater or lesser importance to some positions within a cell relative to others. Weighting can also be applied at the network level to give some cells greater or lesser importance relative to others. In either case, the weighting function can, for example, be a linear function. Alternatively, it can be a minimum function. At the cell level, weighting can be based, at least in part, on a signal attenuation level between cells in the candidate set of cells. Weighting at the cell level can also be based, at least in part, on a distance between cells in the candidate set of cells.

Other aspects are described in the following description and defined in the attached claims.

Advantages of various embodiments include proper primary and secondary synchronization sequence detection performance. This in turn leads to easier cell search capability as well as improved positioning performance.

BRIEF DESCRIPTION OF THE DRAWINGS

The objects and advantages of the invention will be understood by reading the following detailed description in conjunction with the drawings in which.

DETAILED DESCRIPTION

Figure 1:
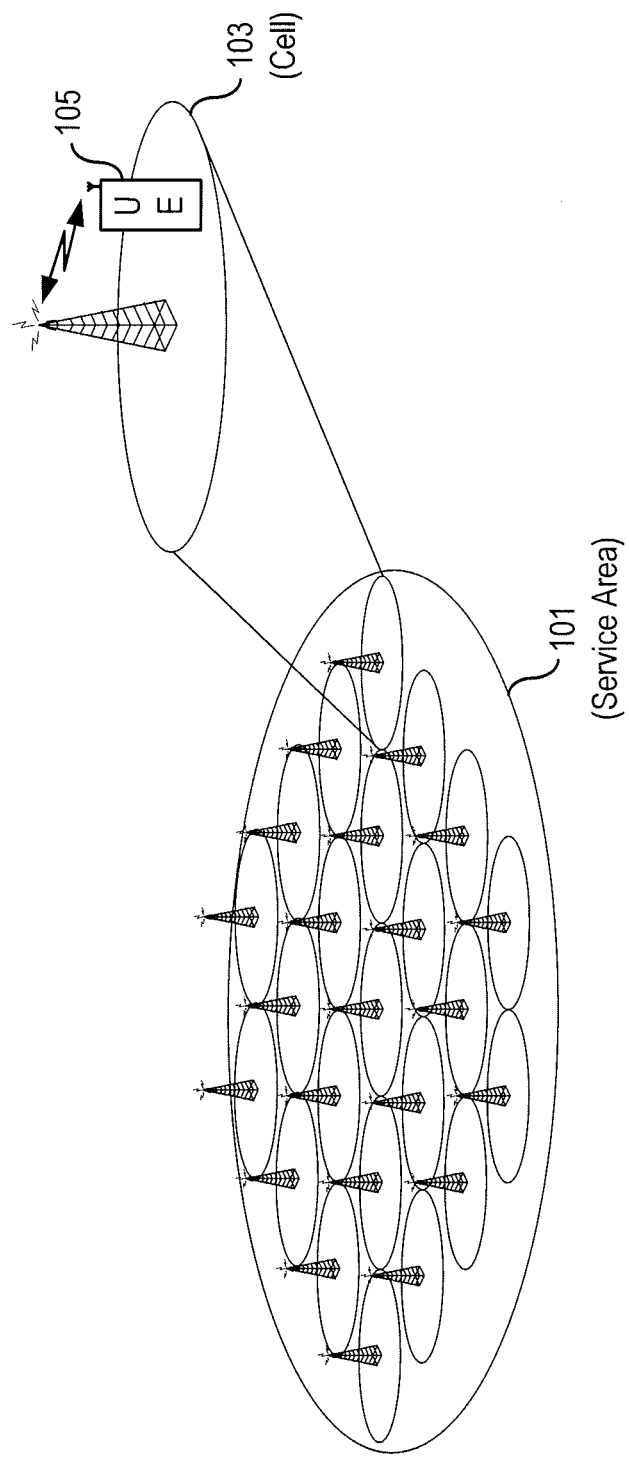
FIG. 1 illustrates a mobile communication service area, such as an LTE system service area, that comprises a number of cells.
Figure 2:
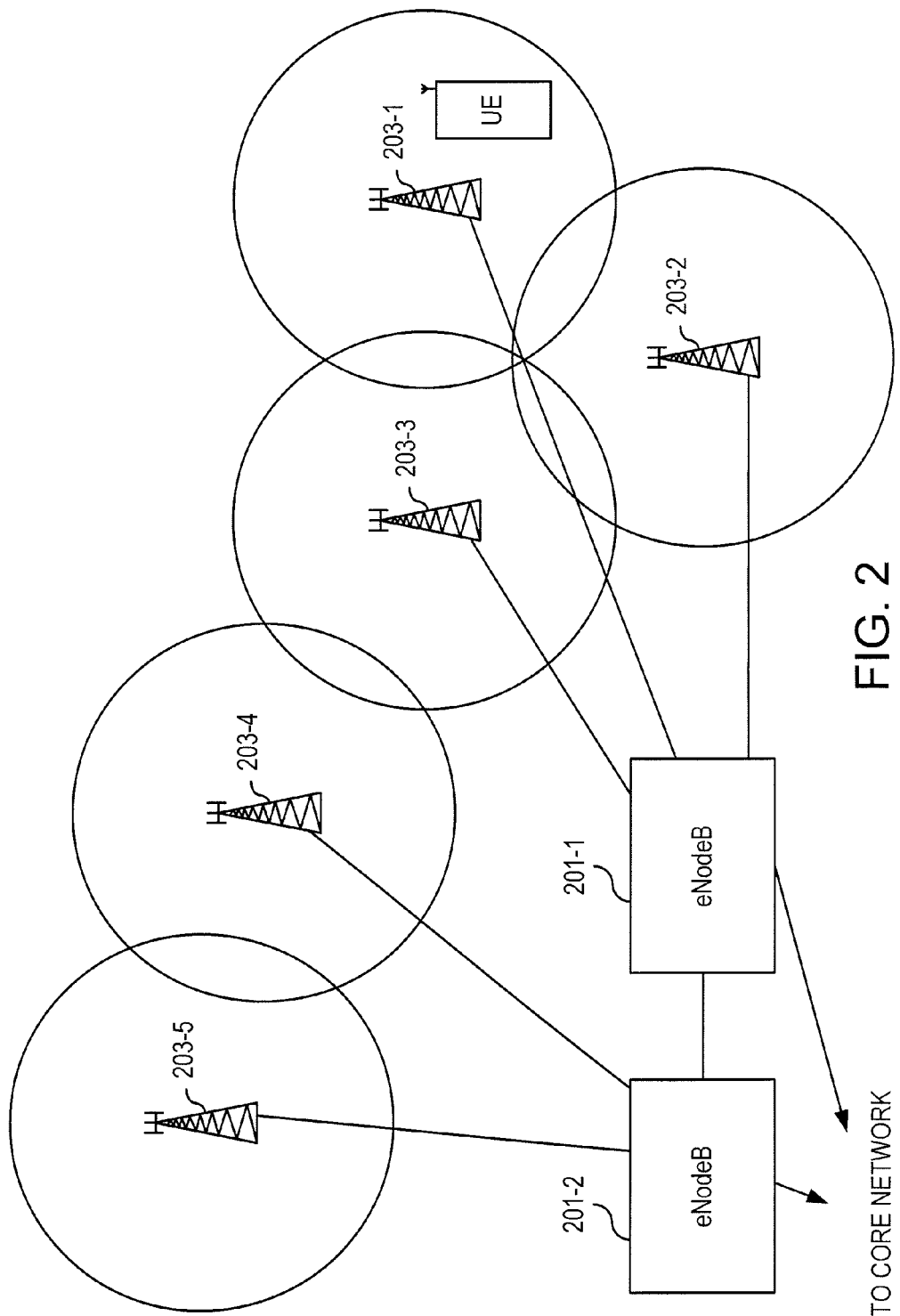
FIG. 2 is a simplified cell planning diagram.
Figure 3:
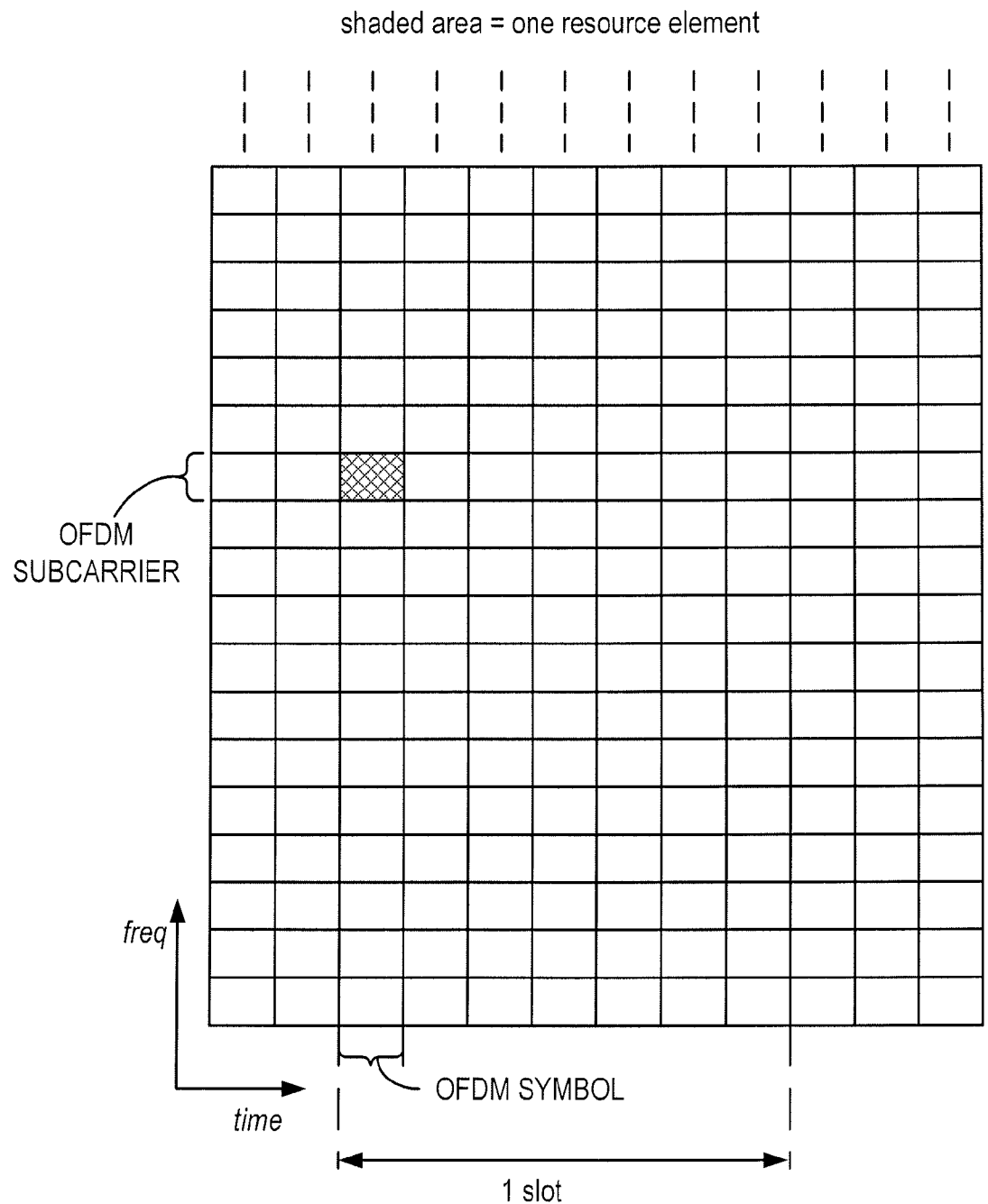
FIG. 3 is a time-frequency grid illustrating the structure of an LTE resource element.
Figure 4:
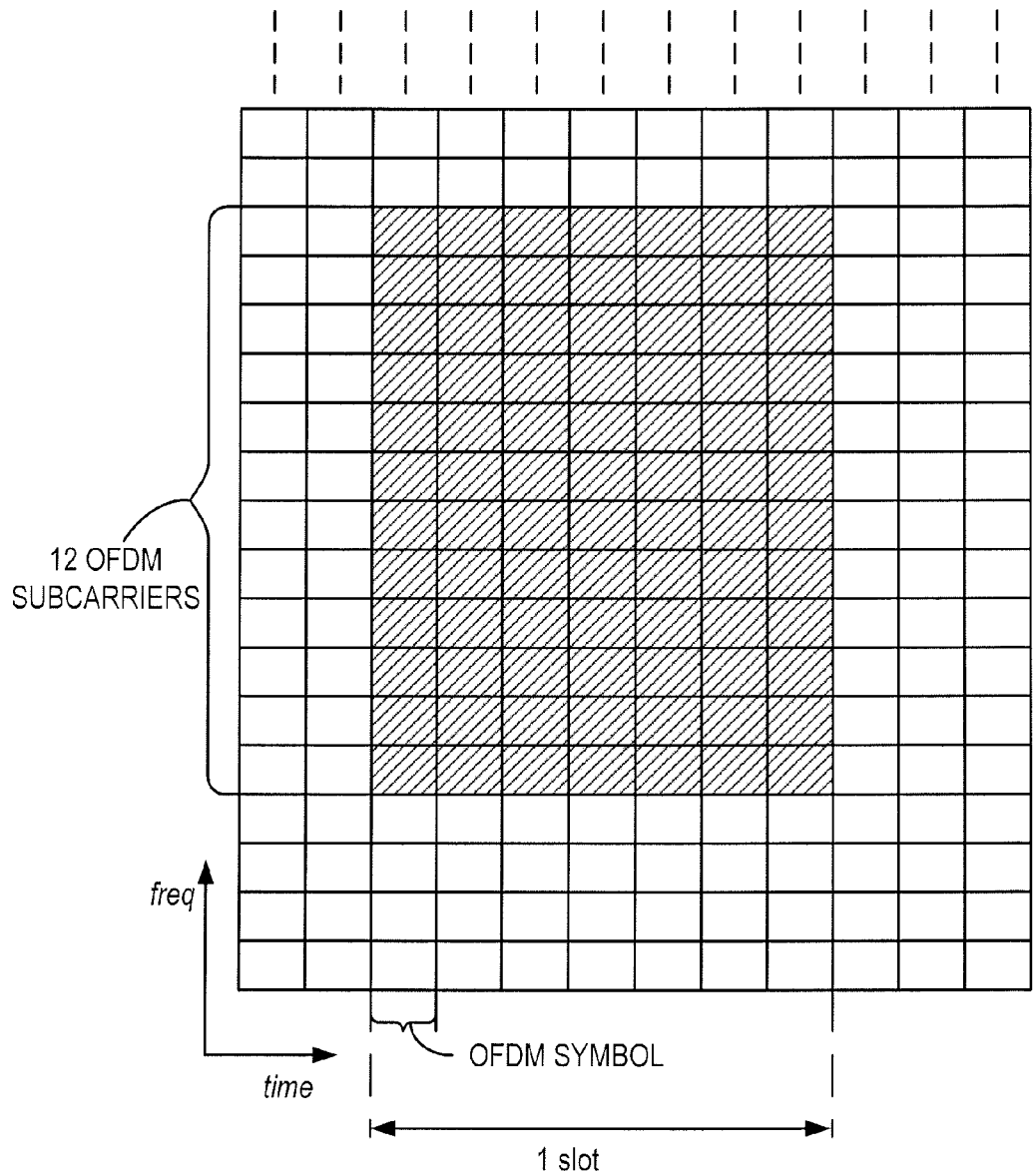
FIG. 4 illustrates how downlink subcarriers in the frequency domain are grouped into resource blocks.
Figure 5A:
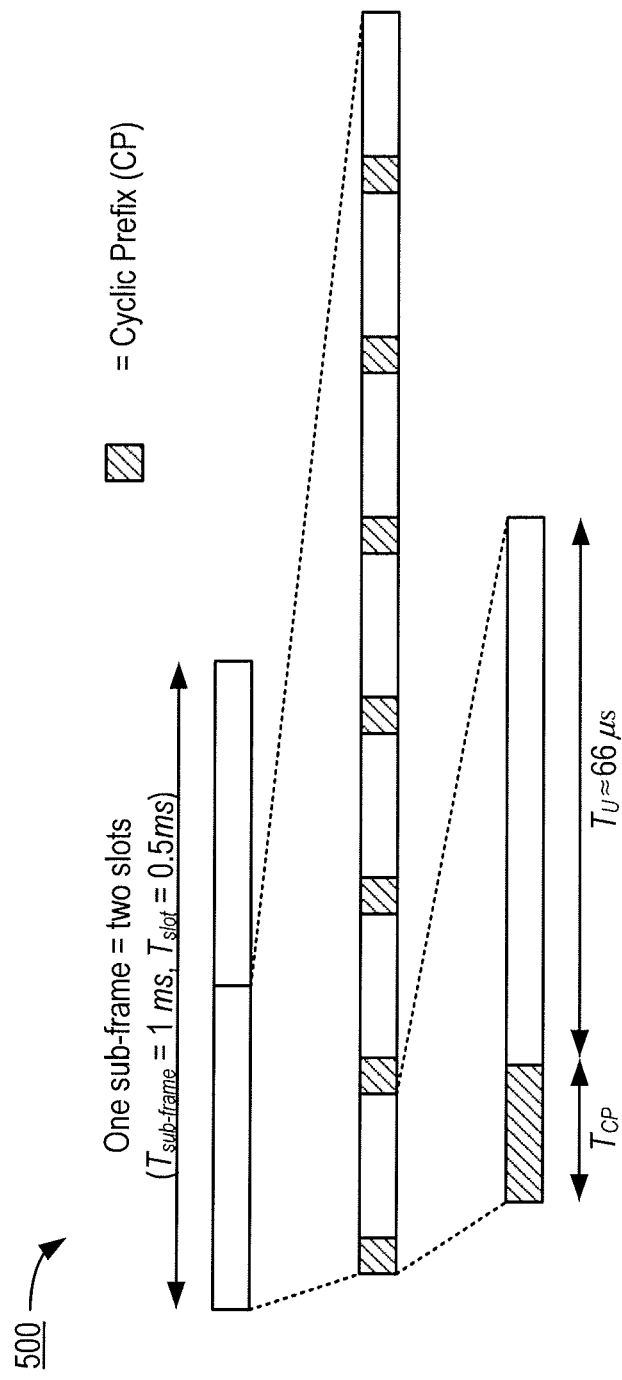
FIGS. 5a and 5b illustrate the time-domain structure for LTE downlink transmission.
Figure 5B:
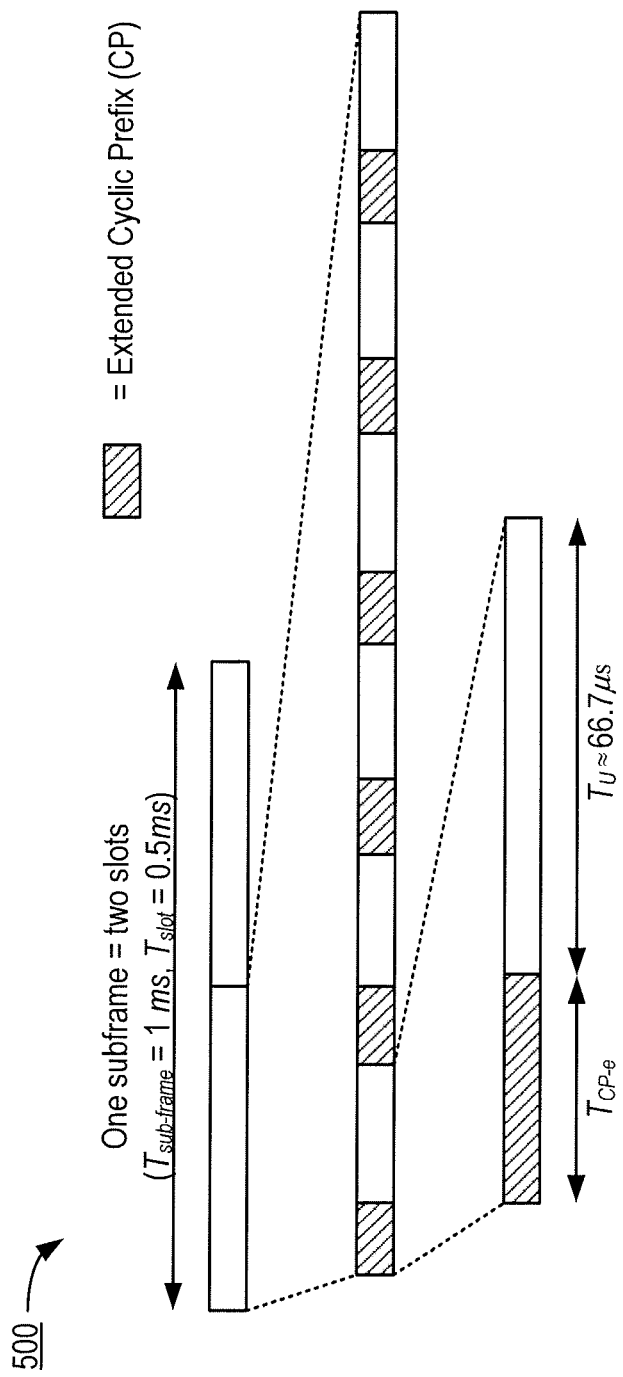
Figure 6:
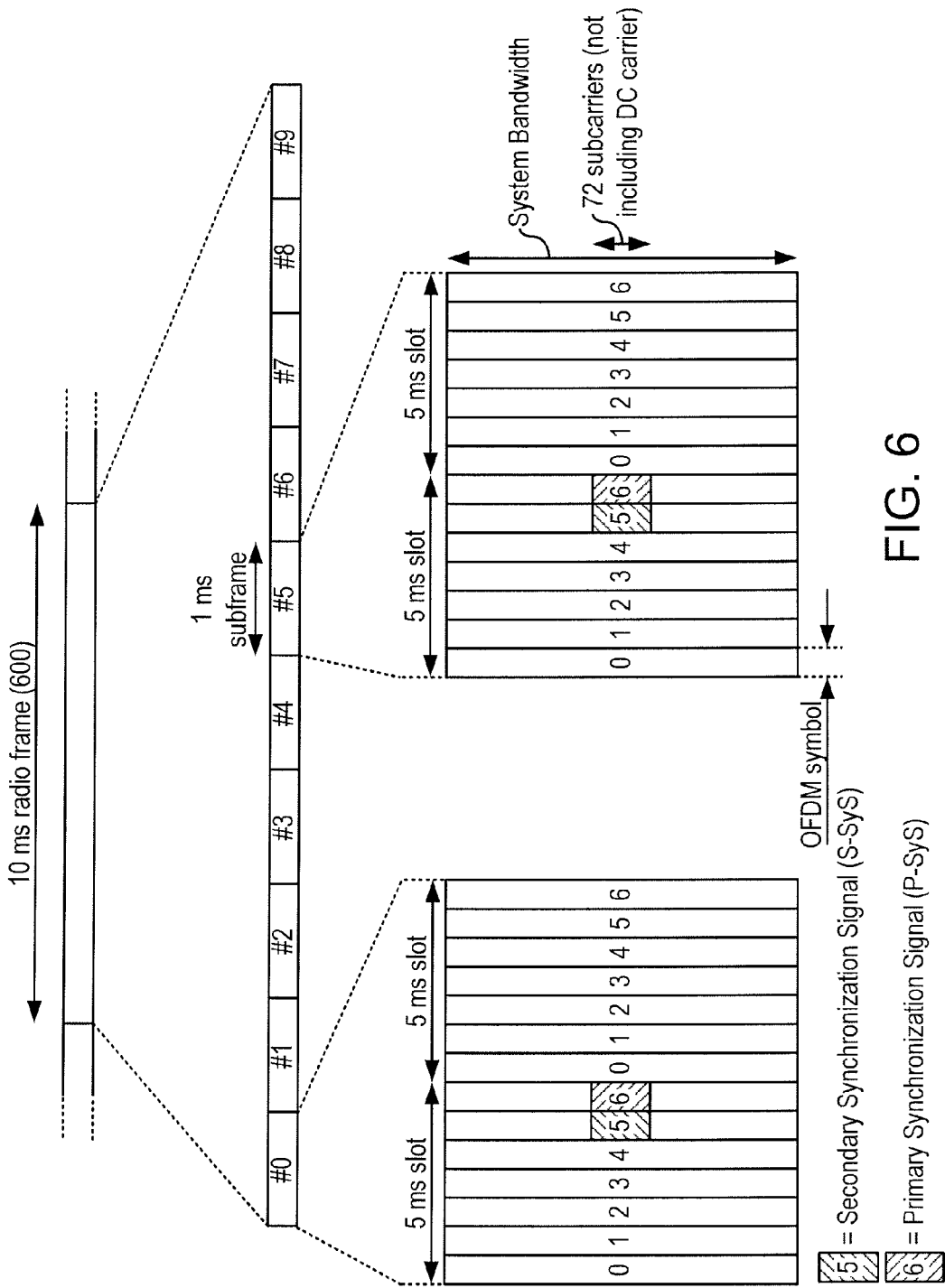
FIG. 6 illustrates the structure of the radio interface of an LTE system.
Figure 7A:
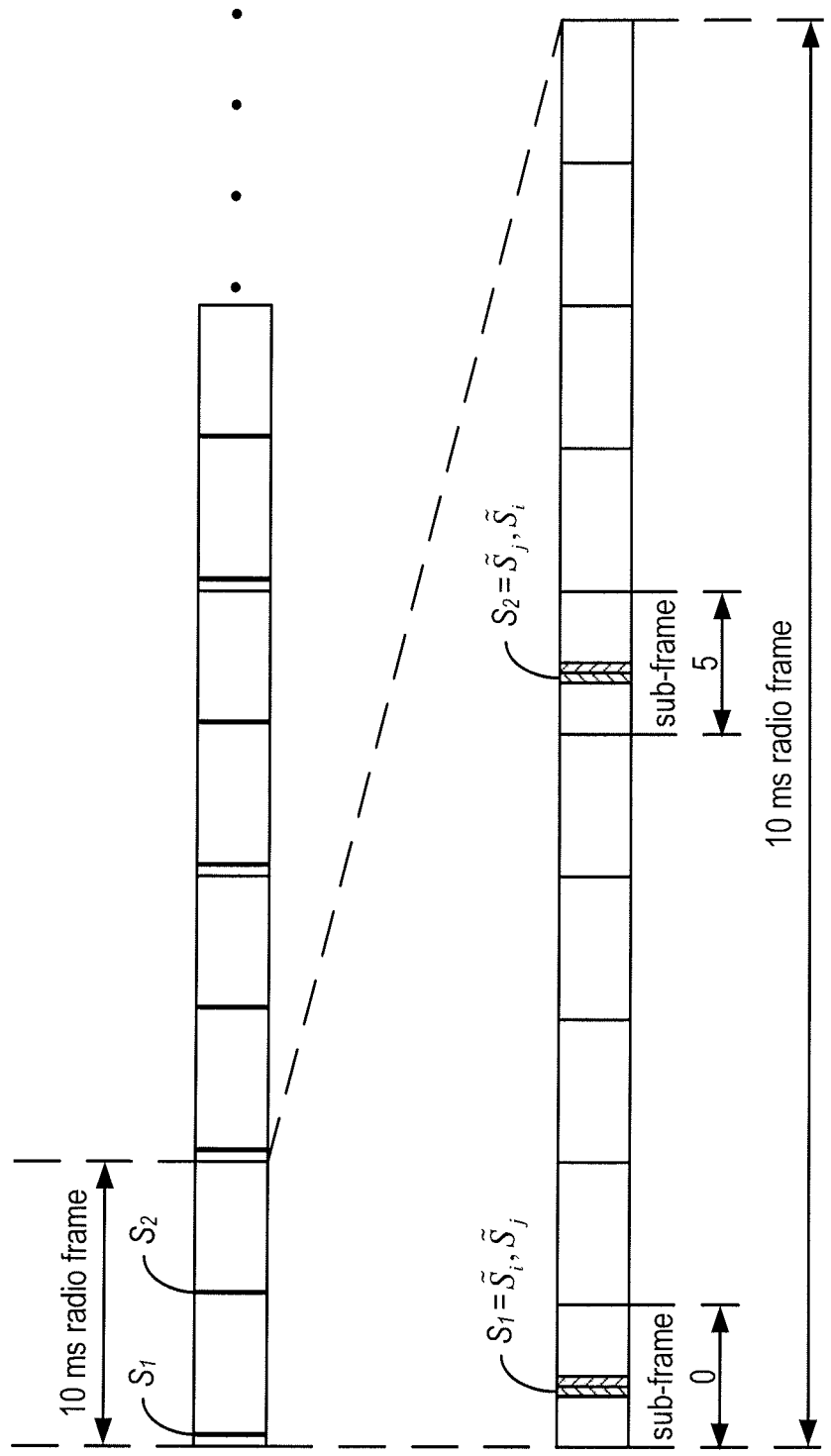
FIGS. 7a and 7b illustrate how secondary synchronization signal sequences can be transmitted.
Figure 7B:
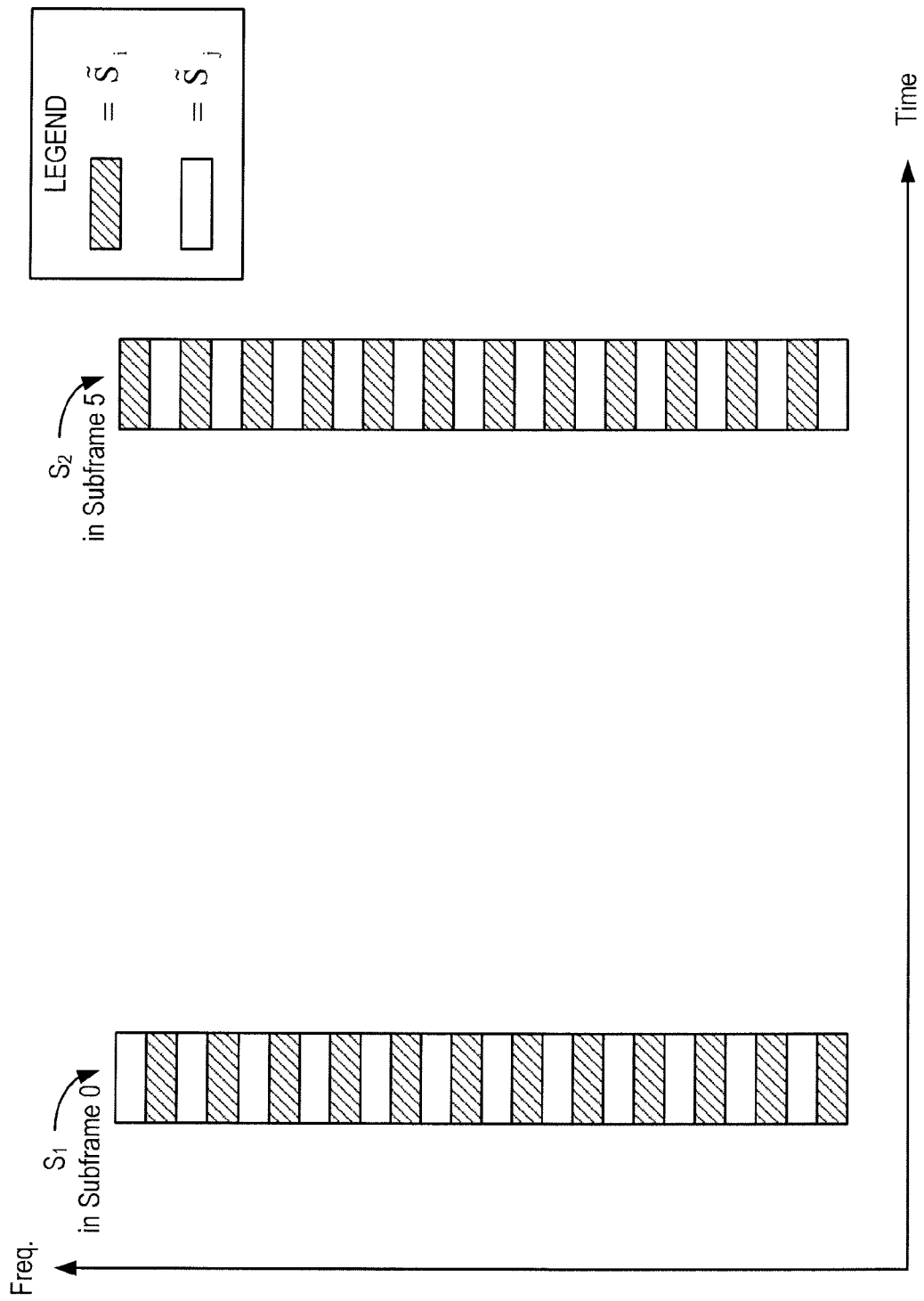

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

Figure 8:
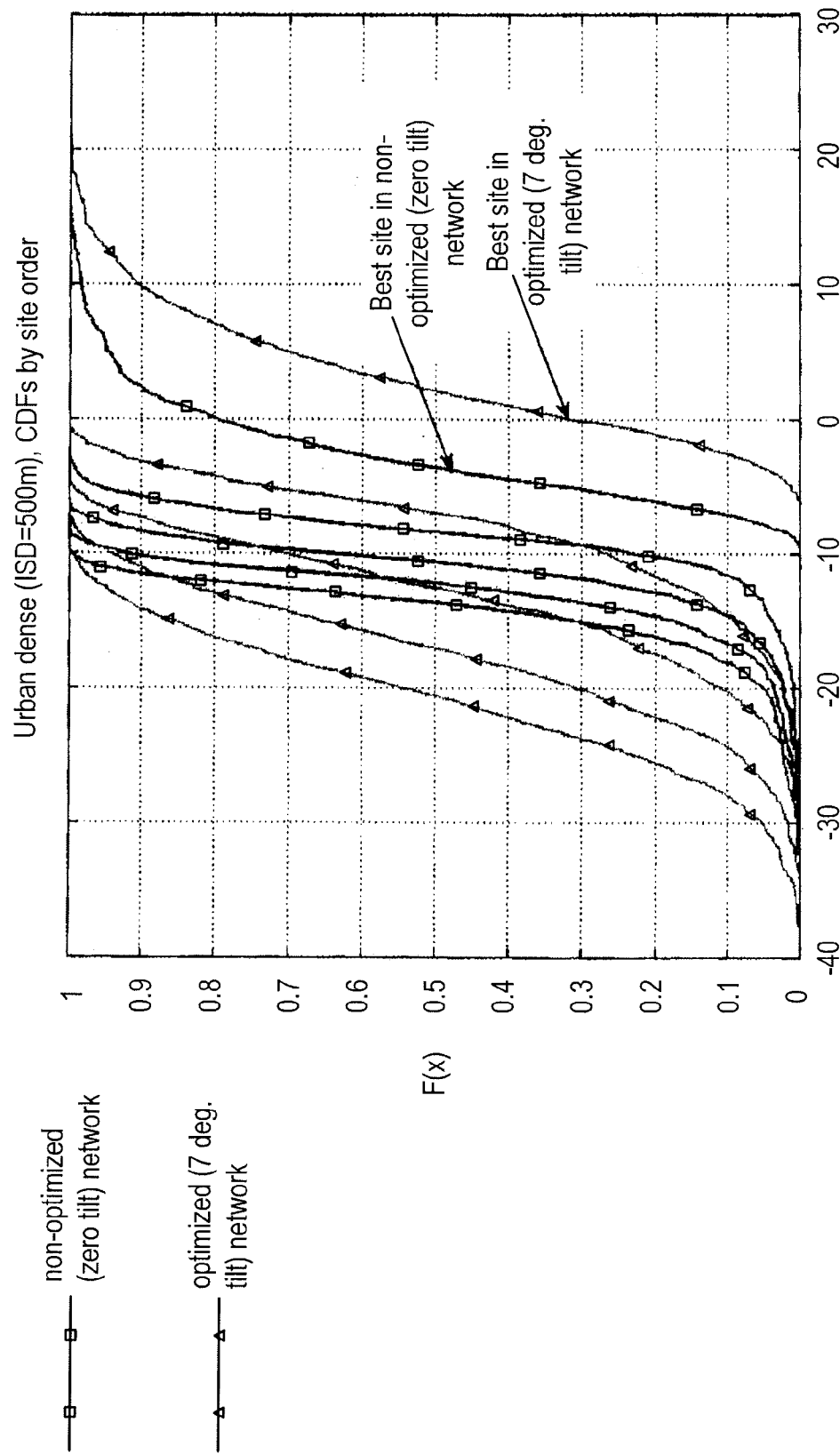
FIG. 8 is a set of graphs showing exemplary cumulative distribution functions (cdf) for the signal-to-noise ratios (SNR) for the best cell, the second best cell, the third best cell, and so on, in an exemplary mobile communication system.

As explained earlier, it is desired to provide methods and apparatuses that facilitate the use of secondary synchronization signals (and their equivalent in other systems) to enhance the performance of services such as those utilizing positioning systems. (As used herein, the term "positioning performance" means the accuracy with which a positioning system and/or algorithm is able to determine a location of a UE based on its supplied input parameters.) However, the inventors have recognized a shortcoming in conventional arrangements. In particular, since the secondary synchronization signal is made up of two sub-sequences, some of the cell groups have one short secondary synchronization signal sequence in common. In practice, this means that the processing gain (e.g., the ability to distinguish between individual synchronization signal sequences) is only 3 dB, and not 18 dB, which is the ideal number assuming a length 62 M-sequence. For positioning purposes, there are requirements for finding cells (in total 3-4 cells including serving cell) well below (i.e., 10-15 dB) the strongest (serving) cell. This is illustrated in FIG. 8, which is a set of graphs showing exemplary cumulative distribution functions (cdf) for the signal-to-noise ratios (SNR) for the best cell, the second best cell, the third best cell, and so on, in an exemplary mobile communication system.

Figure 9A:
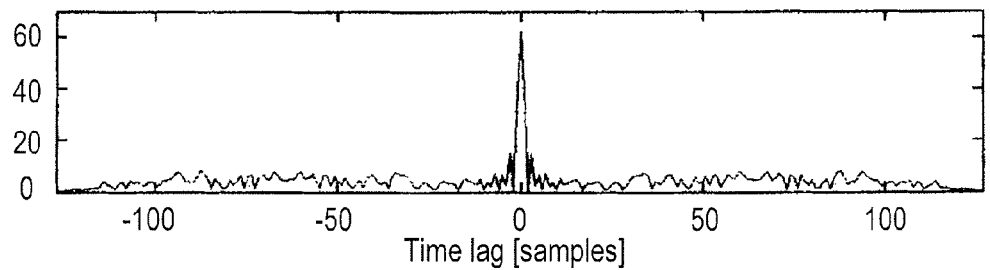
FIG. 9a is a graph of the autocorrelation function between the secondary synchronization signal sequence for cell ID 110 and delayed versions of the same sequence.
Figure 9B:
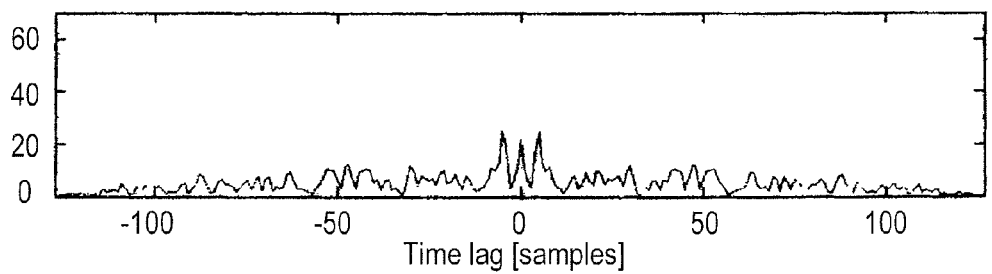
FIG. 9b illustrates the cross correlation between the secondary synchronization signal sequence for cell ID 110 with time delayed versions of the secondary synchronization signal sequence for cell ID 271.

The inventors have also ascertained that there are some undesirable cross correlation properties for some of the primary/secondary synchronization signal sequence combinations, which can detrimentally affect positioning performance. This can be seen by comparing the graphs depicted in FIGS. 9a, 9b, and 9c. FIG. 9a is a graph of the autocorrelation function between the secondary synchronization signal sequence for cell ID 110 and delayed versions of the same sequence. As can be seen, the peek correlation occurs when there is no delay between the sequences. For comparison purposes, FIG. 9b illustrates the cross correlation between the secondary synchronization signal sequence for cell ID 110 with time delayed versions of the secondary synchronization signal sequence for cell ID 271. As can be seen, there are some significant correlations at and closely centered around zero time lag. The secondary synchronization signal sequence for cell ID 271 is not the only secondary synchronization signal sequence having non-insignificant correlations with the secondary synchronization signal sequence for cell ID 110; others exist, as can be seen in FIG. 9c which illustrates the zero time lag cross correlation between the secondary synchronization signal sequence for cell ID 110 and all 504 secondary synchronization signal sequences.

The inventors have therefore concluded that, due to the specific correlation structure for the secondary synchronization signal sequences as described above, there is a need for efficient primary/secondary synchronization sequence planning strategies that take the specific properties of the LTE synchronization signals into account when doing cell planning of an LTE cellular system.

In an aspect of embodiments consistent with the invention, primary and secondary synchronization sequence allocations to cells of a mobile network are planned in a way that achieves improved performance, especially in scenarios in which good UE positioning performance is needed. At least one performance indicator (on a cell level) is suggested, the performance metric being a function of the time correlation between different secondary synchronization signal sequences for the different cell IDs. In other aspects, the performance metric may be evaluated in more detail for different parts of a cell by considering, for example, physical distances between cells, terrain profiles and/or tilt patterns for cells. These and other aspects will now be described in greater detail in the following.

Figure 9C:
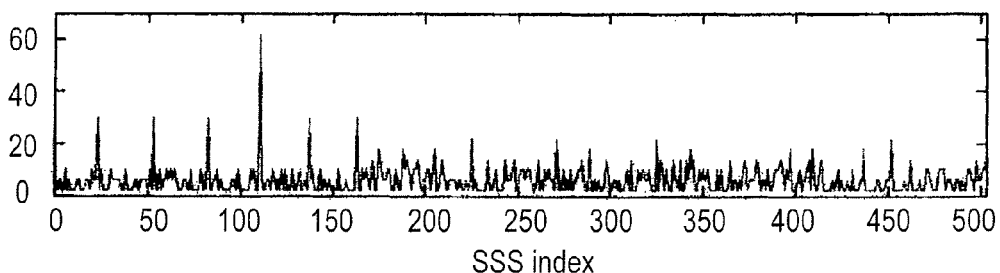
FIG. 9c illustrates the zero time lag cross correlation between the secondary synchronization signal sequence and all 504 secondary synchronization signal sequences.

The discussion starts by taking a closer look at FIGS. 9a, 9b, and 9c, which illustrate the time domain secondary synchronization signal sequence correlation properties. FIG. 9a show the auto correlation for a secondary synchronization signal sequence associated with cell ID 110 in an LTE system. FIG. 9b shows cross correlation properties with the secondary synchronization signal sequence between the secondary synchronization signal sequence for cell ID 110 and cell ID 271. Finally FIG. 9c shows the zero time lag cross correlation computed between the secondary synchronization signal sequence for cell ID 110 and all 504 cell ID secondary synchronization signal sequences. It can be seen in FIG. 9c that there are a number of cell IDs for which the cross correlation is 31, (i.e., only 3 dB lower than the main peak illustrated in FIG. 9a, which has a value of 62). The interested reader can refer to 3GPP TS 36.211, section 6.11 for more information about how secondary synchronization signal sequences are generated. Looking closer into the generation of the secondary synchronization signal sequences, one can derive which sequences give a worst case processing gain of only 3 dB. In particular, assume that each cell ID (denoted cell ID "i") has a primary synchronization signal sequence, denoted "pi", and a secondary synchronization signal sequence made up of short sequences denoted (s1$i$, s2$i$). Then, only 3 dB processing gain at time lag 0 is achieved (compared to the ideal 18 dB) for all other cell IDs having the same (pi and s1$i$) or the same (pi and s2$i$) when correlating these cell's secondary synchronization signal sequences to the secondary synchronization signal sequence for cell ID "i". (Note that even worse results would occur if the neighboring/adjacent cell were to have the same (pi and s1$i$) and the same (pi and s2$i$), which would be the case if the same cell ID were to be used in neighboring/adjacent cells.)

Hence, from a positioning performance point of view (and also, in fact cell search point of view) two such cell IDs should not be planned to be geographically close to one another because such sequence/cell planning may cause positioning performance to suffer in an area around the two cells. Hence, an aspect of the invention involves sequence/cell planning in a way that avoids such situations.

Other aspects of embodiments consistent with the invention detect other cell ID combinations that should not be adjacent/close to each other. FIG. 9b shows one such example. As illustrated in the figure, Cell ID 271 has a (non zero time lag) cross correlation of approximately 23 (4 dB processing gain) with cell ID 110, giving a processing gain that is too small to ensure good positioning performance. There are other cell IDs that, when located near one another, could similarly yield poor positioning (and cell search) performance. Therefore, an aspect of some embodiments consistent with the invention involves using information obtained by searching over all 504 cell IDs presently defined in the applicable standard (e.g., in 3GPP TS 36.211, section 6.11) and identifying which pairs of cell IDs have—for any time lag, or at least time lags that are smaller than the cyclic prefix order of magnitude (+−9 samples)—a processing gain that is smaller than, for example, a predefined threshold (e.g., x dB, where x is on the order of <6-10 dB).

Figure 10:
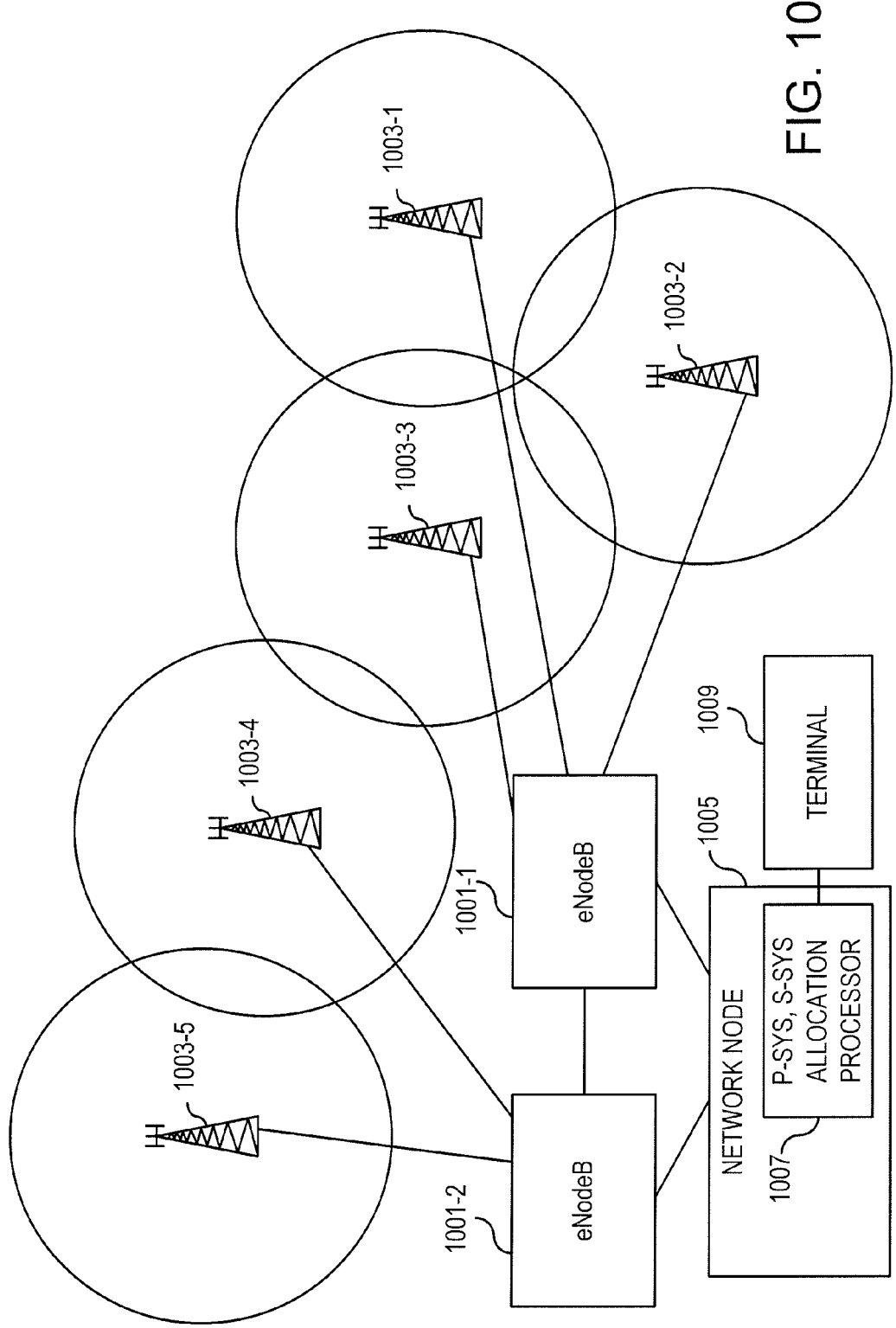
FIG. 10 is a block diagram of circuitry configured to carry out any combination of the variously described inventive aspects.

FIG. 10 is a block diagram of circuitry configured to carry out any combination of the various inventive aspects described herein. A core network (not shown) is connected to one or more evolved UTRAN Node Bs (eNodeB) (1001-1, 1001-2) (generally referred to by means of reference numeral 1001). Each eNodeB 1001 is capable of communicating with every other eNodeB 1001 in the same network. As can be seen in FIG. 10, one eNodeB 1001 connects to one or more antennas, 1003-1, 1003-2, . . . , 1003-M (generally referred to by the reference numeral 1003). The eNodeB 1001 is a logical node handling the transmission and reception of a set of cells. Logically, the antennas of the cells belong to the eNodeB but they are not necessarily located at the same antenna site. Thus, one eNodeB 1001 can be responsible for one or more cells. As the invention is not limited to application only in an LTE system, however, in this specification the term "base station" is used as a generic term, rather than a system-specific term, to further emphasize that the invention is not limited to applications in only the specific exemplary systems.

Another node 1005 in the network includes an allocation processor 1007 that carries out suitable steps in accordance with any combination of the various embodiments described herein. A terminal 1009 is operatively connected to the allocation processor 1007 to enable human interaction with the allocation processor 1007 (e.g., to provide parameters such as which cells are to be involved in an evaluation set, one or more threshold values, types of metrics to be considered, important geographical areas, etc.).

Figure 11:
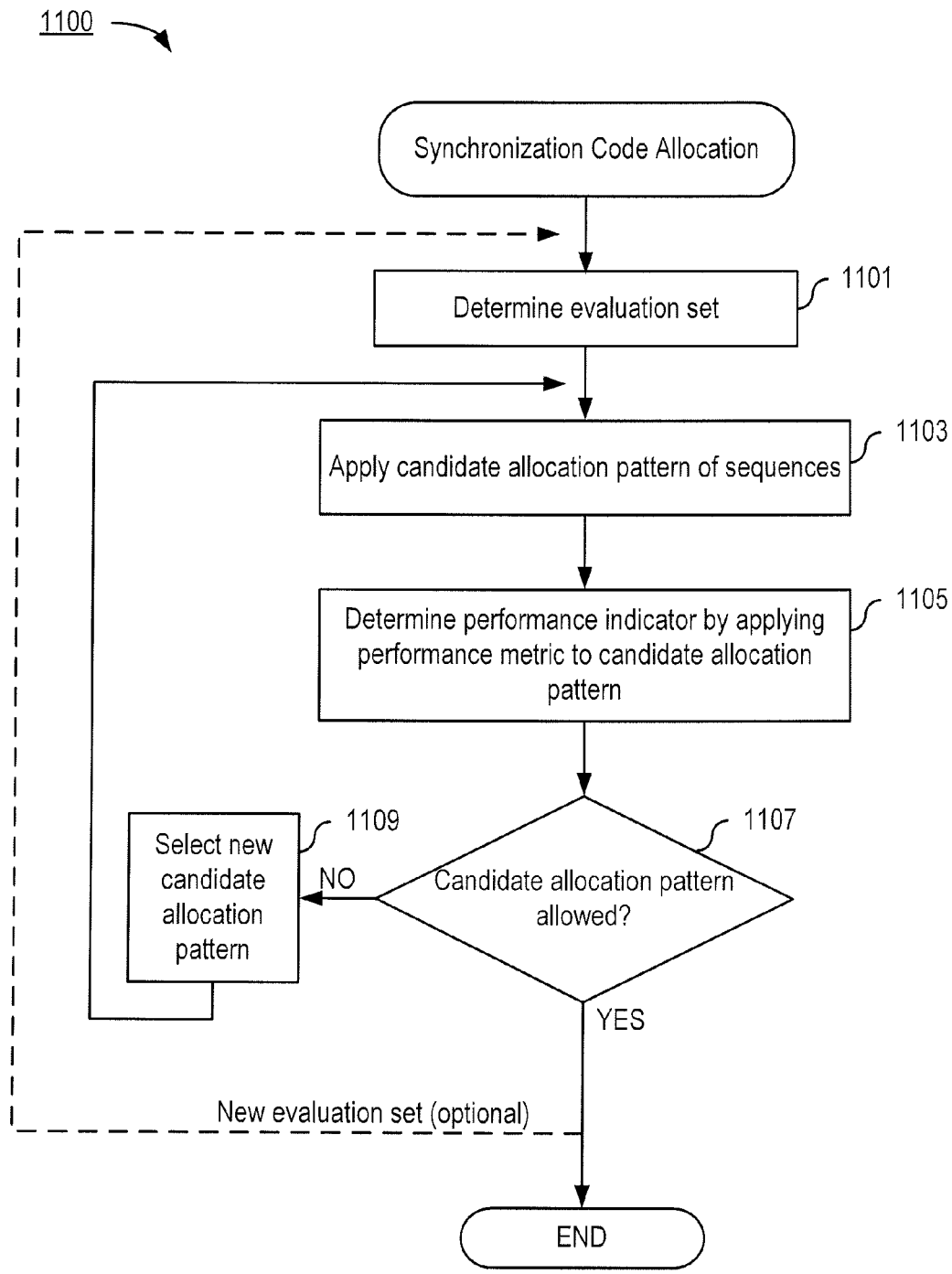
FIG. 11 is, in one respect, a flow diagram of steps carried out to arrive at a suitable cell ID allocation in accordance with an aspect of embodiments consistent with the invention.

To arrive at a suitable cell ID allocation that will facilitate positioning services, the allocation processor 1007 is configured to carry out steps/processes such as those illustrated in the flow diagram of FIG. 11. FIG. 11 can alternatively also be considered to depict an allocation processor 1100 comprising circuitry configured to carry out the variously described functions. Any of the variously depicted blocks can be implemented by means of, for example, one or more processors combined with program code designed to cause the processor(s) to carry out the described functions. The design of such program code is well within the skill level of those skilled in the art when guided by the principles described herein. Those of ordinary skill in this art would also readily be able implement any of the depicted blocks in the form of specialized circuitry (i.e., instead of processors with program code) that carries out the described function.

Figure 12:
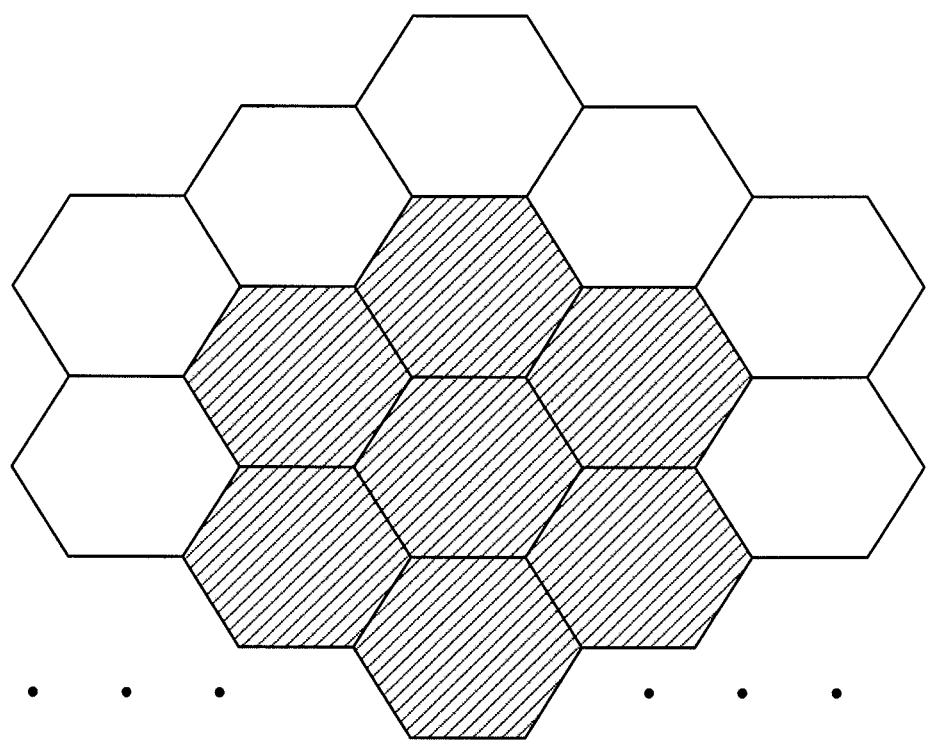
FIG. 12 is a diagram depicting cells in an exemplary mobile network.
Figure 12:
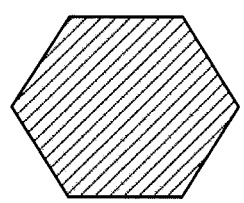

The process begins by determining an evaluation set of cells to which cell IDs (and hence, primary and secondary synchronization sequences) will be allocated. To help illustrate this point, reference is made to FIG. 12, which is a diagram depicting cells in an exemplary mobile network. Each cell is (or will be) allocated a physical cell identity. This means that, for a given cell, "i", there are assigned primary and secondary synchronization signal sequences. The primary synchronization signal sequence for cell "i" is denoted "pi", and the secondary synchronization signal sequence comprises two short sequences, denoted s1$i$ and s2$i$, respectively. In order to plan a network in accordance with an aspect of some embodiments consistent with the invention, an evaluation set of cells consisting of a subset (of at least two cells) of network cells are chosen (step 1101). An exemplary subset of cells is depicted by means of crosshatching in FIG. 12. Different cell IDs (in the form of a sequence triplet, [pi,(s1$i$, s2$i$)], representing the primary synchronization signal sequence and the secondary synchronization signal sequence pair) are assigned to each cell in the evaluation set (step 1103). The evaluation set plus the assigned sequence triplets are called a candidate allocation (sequence triplet) pattern.

Next, a performance indicator representing the positioning performance for the candidate allocation pattern is determined by applying a performance metric to the candidate allocation pattern (step 1105). One type of performance metric represents the number of "collision cell IDs", for the whole candidate allocation pattern. For example, a "collision" can be said to occur if adjacent/neighboring cells have the same (pi and s1$i$) or the same (pi and s2$i$), as described earlier. Alternatively, or in addition, a "collision" can be said to occur if the cross correlation between sequences corresponding to two cell IDs (either time aligned or with one lagging the other in time as illustrated in FIG. 9$b$) exceeds a predetermined threshold value.

The performance indicator is then tested to determine whether the candidate allocation pattern is allowable (decision block 1107). This can be achieved by, for example, comparing the performance indicator with a predefined threshold value representative of minimum acceptable positioning performance. If the candidate allocation pattern is not acceptable ("NO" path out of decision block 1107) (e.g., if a cell ID causing a "collision" has been identified), then a new (different) candidate allocation pattern is selected (step 1109) and the process is repeated, beginning at step 1103. Otherwise ("YES" path out of decision block 1107), the process can terminate. In alternative embodiments, the process is repeated even if the candidate allocation pattern is acceptable, but this time for a new evaluation set, such as one that adds one or more cells to the just-evaluated evaluation set (see dotted line path in FIG. 11). In this way, an acceptable allocation pattern can be built up from a small group of cells to a larger group.

Figure 13:
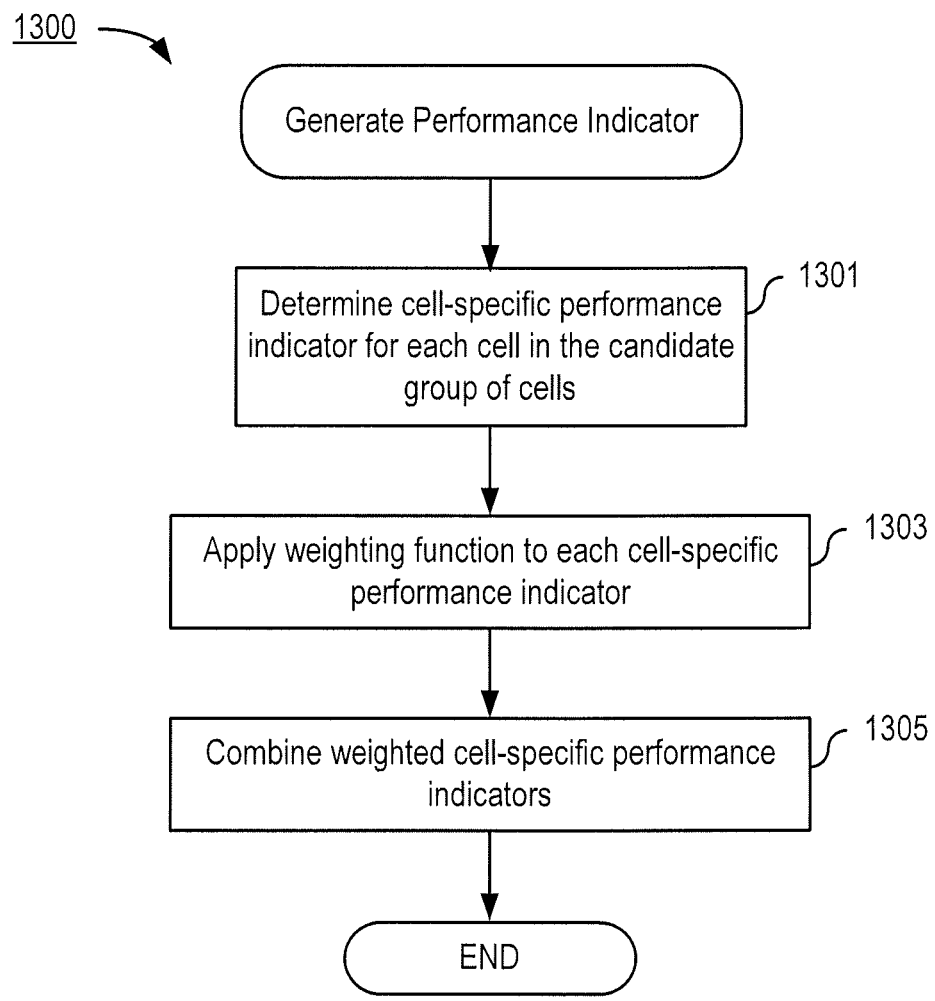
FIG. 13 is, in one respect, a flow diagram of steps/processes for determining one type of performance metric in accordance with an aspect of embodiments consistent with the invention.

In alternative embodiments, different types of performance metrics can be used to generate performance indicators, either alone or in combination with others. For example, FIG. 13 is a flow diagram of steps/processes for determining one type of performance indicator. FIG. 13 can alternatively also be considered to depict metric computation circuitry 1300 comprising circuitry configured to carry out the variously described functions. Any of the variously depicted blocks can be implemented by means of, for example, one or more processors combined with program code designed to cause the processor(s) to carry out the described functions. The design of such program code is well within the skill level of those skilled in the art when guided by the principles described herein. Those of ordinary skill in this art would also readily be able implement any of the depicted blocks in the form of specialized circuitry (i.e., instead of processors with program code) that carries out the described function.

First, given a candidate (sequence) allocation pattern, a cell-specific performance indicator is determined for each cell in the candidate group of cells (step 1301), wherein each cell-specific performance indicator indicates an estimated positioning performance quality for a corresponding cell in the candidate group of cells. Such a cell-specific performance indicator could be as simple as, for each cell in the candidate group of cells, calculating the number of "collisions" (as discussed above) with respect to all cells within a certain radius (in meters, in cell radii, or similar) from the actual cell.

In a subsequent step, a weighting function is applied to the estimated cell-specific performance indicators (step 1303), so that the cell-specific performance indicators of some cells will be more influential than others when deciding whether the candidate sequence allocation pattern is acceptable. The weighted cell-specific performance indicators are then combined to produce a performance indicator that indicates the positioning performance quality of the candidate allocation set (step 1305).

Different types of weighting functions can be used in alternative embodiments. If the weighting function is a mere addition of the individual cell-specific performance indicators (i.e., all cell-specific performance indicators are weighted equally), the above-described embodiment is achieved.

However, by ascertaining cell-specific performance indicators and then applying non-equal weighting prior to combining them, more advanced analytical tools can be designed. In one alternative, for example, a cell-specific performance indicator is generated, for each cell of the evaluation set, by means of a performance metric involving calculating the number of "collisions", not limited to cells within a radius from the actual cell, but limited to those cells whose transmitted signal attenuation (as perceived by the cell for which the cell-specific indicator is being calculated) is no more than a predefined threshold level. The amount of attenuation may be computed using geographical locations, the antenna diagrams for cell sectors, tilts of antennas and/or terrain profiles.

Yet another way of ascertaining a cell-specific performance indicator is by, for each cell in the evaluation set, calculating a cell-specific performance indicator for a number of positions within the cell, and selecting from these performance indicators the cell-specific performance indicator representative of a best possible positioning performance of a receiver receiving signals from all cells of the evaluation set with their individual attenuations and with respect to the allocated sequences. In this respect it will be understood that positioning performance is also related to the UE's processing capabilities. If possible, when working with a new communication standard, the designer should try to anticipate the capabilities of the UEs that will populate the system (e.g., anticipate how many simultaneous synchronization signals the UEs will be able to receive from different cells, and anticipate how well the UEs will be able to select from these a sufficient number of signal sequences to achieve good positioning performance). If this is not possible, positioning performance should be estimated based on expected minimum UE capabilities.

In yet another alternative, instead of basing allocation decisions on a best possible positioning performance achievable within a given cell, a cell-specific performance indicator is calculated for a number of positions within the cell, and from these performance indicators the cell-specific performance indicator representative of the worst positioning performance of the cell is selected.

The discussion will now focus further on embodiments that involve weighting. At the cell level, one or more cell-specific performance indicators are ascertained for each cell. Having more than one cell-specific performance indicator per cell can result from applying different positioning performance metrics to the cell, from applying the same positioning performance metric to different locations within the cell, or a combination of both. Thus, in general there may be some number, n, of results per cell. If the number of cells in a candidate set of cells is m, it follows that there are m·n cell-specific results that can be combined to ascertain a performance indicator for the candidate allocation pattern.

In some embodiments, each one of the m·n cell-specific results is modified by some function prior to any combination step. For example, the function may be a thresholding function. Since the individual results for any given cell may have been derived by different positioning performance metrics, there may be as many as n different functions applied to the n different cell-specific performance indicators.

In addition, in some embodiments the n cell-specific positioning performance indicators for each cell are combined to form a single overall cell-specific performance indicator for the cell. For example, this cell-level combining can be by means of a linear function such as, for a given cell i:

$$\text{Performance Indicator}_{Overall\_cell\_i} = \sum_{j=1}^{n} \text{performance indicator}_{i,j} \cdot weight_j.$$

In an example of an alternatively embodiment, cell-level combining of performance indicators can be by means of a minimum function, such as:

$$\text{Performance Indicator}_{Overall\_cell\_i} = \min_{j}(\text{performance indicator}_{i,j}),$$
$$1 \le j \le n.$$

In yet another aspect, combining can be performed at the network level, either with or without the above-described cell-level combining. This generates a performance indicator for the candidate allocation pattern. Here too, combining can be by means of a linear function, such as:

$$\text{Performance Indicator}_{Allocation\_Pattern} =$$
$$\sum_{i=1}^{m} \text{Performance Indicator}_{Overall\_cell\_i} \cdot weight_i$$

In an example of an alternatively embodiment, cell-level combining of performance indicators can be by means of a minimum function, such as:

$$\text{Performance Indicator}_{Allocation\_Pattern} =$$
$$\min_{i}(\text{Performance Indicator}_{Overall\_cell\_i}), 1 \le i \le m$$

If cell-level combining and network-level combining both use weighting or if cell-level combining and network-level combining both use a minimum function, then the cell-level and network-level combining can be performed by means of a same step, thereby achieving an efficiency.

It will be understood that the network-level weights, $weight_i$, can be used to make some cells more or less important than other cells, whereas the cell-level weights, $weight_j$, can be used to make different kinds of cell-specific performance indicators more or less important than other cell-specific performance indicators.

Cell/sequence planning in accordance with any combination of the above-described techniques can be performed in a number of ways. In one category of examples, a mobile network is planned from scratch. This allows for sufficient time to evaluate many alternatives. The availability of many choices at this stage of design allows sequences to be allocated that are not in conflict with sequences already in use. The network may be planned to give good performance everywhere or at least in some prioritized areas. Such prioritized areas could be, for instance, highways where good positioning performance is needed (e.g., to assist emergency 911/112 services). The final allocation pattern may be built incrementally. That is, planning may start with candidate allocation patterns focused around one or more important cells. Candidate allocation patterns that are found to be good enough may then be selected as allowable patterns and the areas covered by these candidate/allowable allocation patterns may grow as the allowable patterns propagate.

If more than one important cell is used to start with, frontiers of the allowable allocation patterns will eventually meet and some special problems with sequence allocation may occur. If there are problems getting any allowable allocation patterns, types of weighting functions and the weights that are used may have to be adjusted. Also, a number of alternative allowable allocation patterns may have to be used/increased. For instance, one might have to restrict the sequence allocation strategy to accepting a level of cross correlation between the synchronization sequences of different cell IDs that exceeds the maximum threshold level, and settling for merely fulfilling the requirement that the sequences of adjacent/neighboring cells do not satisfy (pi and s1i) or (pi and s2i), as described earlier.

If cell/sequence planning reveals that many good sequence allocation patterns exist, then one should pick a sequence allocation pattern that allows for limited, easy changes (i.e., a robust allocation pattern) in case an existing mobile network has to be rebuilt or in case an unplanned event requires sequence reallocation. These are discussed further in the following.

Looking first at the case in which an existing mobile network has to be rebuilt, this involves moving, removing, and/or inserting cells into a geographical area that is already served by existing cells. If the network has to stay in use during the rebuild process, the method described above for planning a network from scratch may not be feasible, since such a re-planning effort may involve changing the sequences of too many cells that are already in use. Like starting from scratch, an existing network may be re-planned to give good performance everywhere or at least in some prioritized areas. That prioritization may have to change due to the rebuild. One exemplary way of doing the re-planning is to start the re-planning close to the rebuild area(s), letting the candidate/allowable patterns propagate from there, but using weight functions and weights that allow for a very limited number of sequence changes for cells in use.

Figure 14:
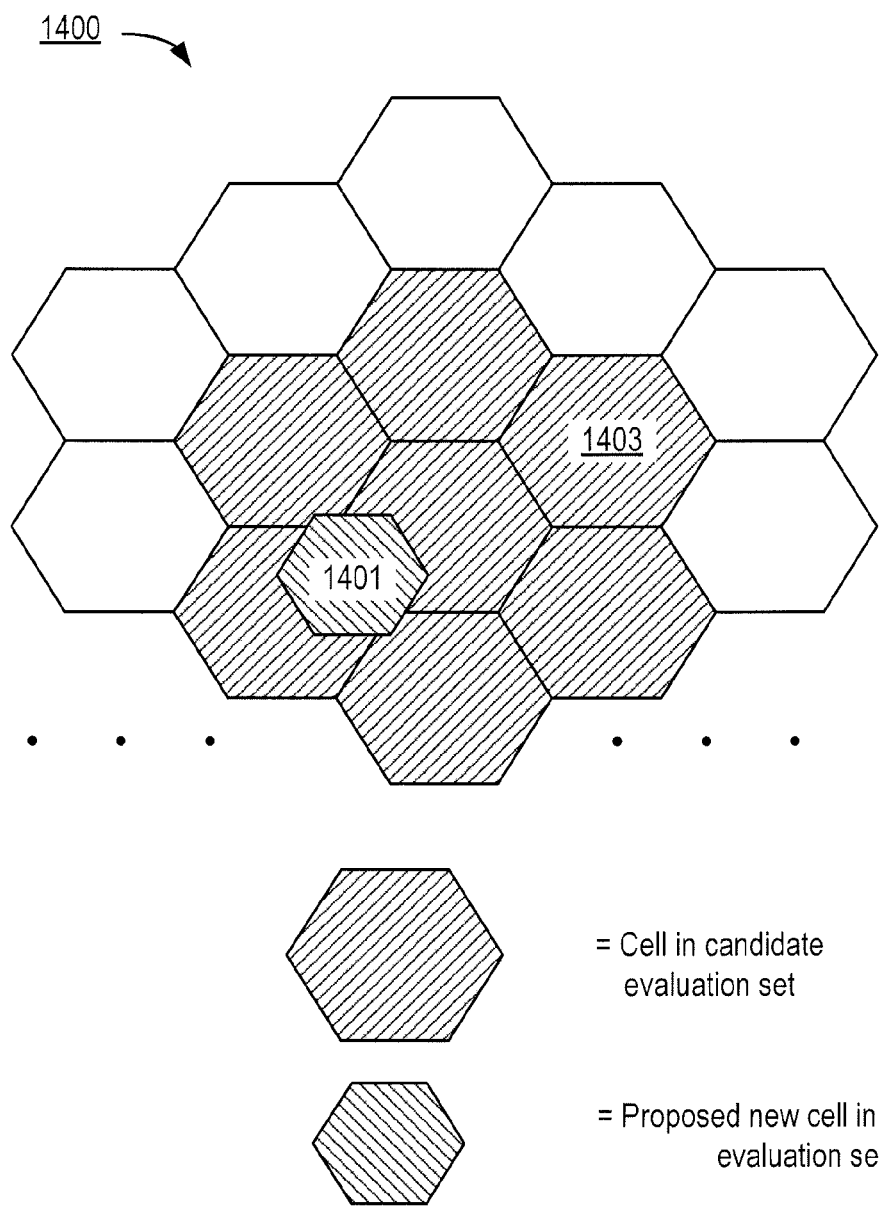
FIG. 14 illustrates an example in which a new cell is to be added to an existing cell plan.

FIG. 14 shows an example in which a new cell 1401 is to be added to an existing cell plan 1400. As described in various embodiments above, a candidate set of cells is chosen for evaluation (see indicated cross-hatching) and sequence triplets are chosen in order to build the candidate allocation pattern. The process could, for example, start with the old cell IDs for the candidate cells and assign a new cell ID for the new cell 1401. Such an approach may limit the number of sequence changes. Alternatively, the process could apply newly selected cell IDs for all cells in the sequence allocation pattern. Regardless of whether "old" or "new" cell IDs are allocated, thereafter the performance metric is applied (e.g., no "cell ID collisions" according to any of the embodiments described above). If an allowable pattern cannot be found, a new performance indicator can be determined by, for example, applying the performance metric to a modified candidate set of cells (e.g., a set of cells in which cells of lesser importance have been excluded). To take an example, the cell 1403 might be considered too far away from the proposed new cell 1401. Or, the performance metric can utilize different weights, for instance, by allowing for a few "cell ID collisions", as detected based on cross correlation values.

As mentioned earlier, the various embodiments that enable cell/sequence planning can also be applied if something unplanned happens in a mobile network. For example, if one cell/base station becomes disabled, the positioning performance of some nearby areas may suffer. The problem may be fixed locally by changing the sequences allocated to some nearby cells. In some embodiments, a plan to address this situation can be devised in advance and stored (e.g., in a computer readable storage medium) for use when needed.

Similarly, a cell/base station's performance may be seriously degraded due to the sudden appearance of a large crowd of people in the area. Again, the various embodiments may be applied to reassign sequences, and such a plan can be made in advance and stored (e.g., in a computer readable storage medium) for use when needed.

The inventive techniques can also be applied when an area that was previously of low priority suddenly becomes important due to the occurrence of an event such as an accident, search operation, and the like. Under such circumstances, it may be permissible to change the sequences in other cells in a large area. It may also be permissible to shut down some cells. Plans to accommodate such changes may be made in advance and stored (e.g., in a computer readable storage medium) for use when needed.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of operating two or more base stations that serve respective cells in a cellular communication system, the method comprising:
   a) determining a candidate allocation pattern of a plurality of primary and secondary synchronization signal sequences for a candidate set of two or more cells that includes the cells served by the base stations;
   b) applying a performance metric to the candidate allocation pattern to ascertain a performance indicator for the candidate allocation pattern, wherein the performance indicator indicates a quality of positioning performance for the candidate set of two or more cells;
   c) ascertaining whether the performance indicator satisfies a predetermined relationship with a threshold performance value for the candidate set of two or more cells;
   d) if the performance indicator satisfies the predetermined relationship with the threshold performance value for the candidate set of two or more cells, then supplying the plurality of primary and secondary synchronization signal sequences to respective ones of base stations corresponding to the two or more cells in accordance with the candidate allocation pattern, and causing each of the two or more base stations to transmit the supplied primary and secondary synchronization signal sequences; and
   e) if the performance indicator does not satisfy the predetermined relationship with the threshold performance value for the candidate set of two or more cells, then changing the candidate allocation pattern of primary and secondary synchronization signal sequences for the candidate set of two or more cells that includes the cells served by the base stations, and repeating steps b) and c).

2. The method of claim 1, wherein:
   each secondary synchronization signal sequence comprises a first sequence and a second sequence; and
   applying the performance metric to the candidate allocation pattern comprises:
      ascertaining whether any two cells in the candidate set of two or more cells have been allocated a same primary synchronization signal sequence and a same first sequence or whether any two cells in the candidate set of two or more cells have been allocated a same primary synchronization signal sequence and a same second sequence.

3. The method of claim 1, wherein applying the performance metric to the candidate allocation pattern comprises ascertaining a degree of correlation between one or both of the primary and secondary synchronization signal sequences of one of the cells in the candidate set of cells and a corresponding one or both of the primary and secondary synchronization signal sequences of another one of the cells in the candidate set of cells.

4. The method of claim 3, wherein applying the performance metric to the candidate allocation pattern comprises ascertaining an extent to which the primary and secondary synchronization signal sequences allocated in accordance with the candidate allocation pattern are correlated with one another for the entire candidate set of two or more cells.

5. The method of claim 4, wherein ascertaining an extent to which primary and secondary synchronization signal sequences allocated in accordance with the candidate allocation pattern are correlated with one another for the entire candidate set of two or more cells comprises:
   ascertaining individual correlation results between primary and secondary synchronization signal sequences of pairs of cells in the candidate set of two or more cells;
   testing each of the individual correlation results to ascertain whether the individual correlation result exceeds a predefined threshold; and
   counting how many of the individual correlation results exceed the predefined threshold.

6. The method of claim 1, wherein applying the performance metric to the candidate allocation pattern to ascertain the performance indicator comprises determining an expected best positioning performance of a user equipment operating in one of the cells served by a corresponding one of the base stations.

7. The method of claim 6, wherein determining the expected best positioning performance of the user equipment operating in the cell served by the corresponding one of the base stations comprises determining the expected best positioning performance based on signal attenuation between the cell served by the corresponding one of the base stations and other cells in the candidate set of two or more cells.

8. The method of claim 1, wherein applying the performance metric to the candidate allocation pattern to ascertain the performance indicator comprises determining an expected worst positioning performance of a user equipment operating in one of the cells served by a corresponding one of the base stations.

9. The method of claim 8, wherein determining the expected worst positioning performance of the user equipment operating in the cell served by the corresponding one of the base stations comprises determining the expected worst positioning performance based on signal attenuation between the cell served by the corresponding one of the base stations and other cells in the candidate set of two or more cells.

10. The method of claim 1, wherein applying the performance metric to the candidate allocation pattern to ascertain the performance indicator comprises:
   ascertaining one or more cell-specific performance indicators for each cell in the candidate set of cells; and
   combining the one or more cell-specific performance indicators of all of the cells in the candidate set of cells to derive the performance indicator for the candidate allocation pattern.

11. The method of claim 10, wherein combining the one or more cell-specific performance indicators of all of the cells in the candidate set of cells to derive the performance indicator for the candidate allocation pattern comprises:
    ascertaining an overall cell-specific performance indicator for each of the cells in the candidate set of cells; and
    combining the overall cell-specific performance indicators of the cells in the candidate set of cells.

12. The method of claim 11, wherein combining the overall cell-specific performance indicators of the cells in the candidate set of cells comprises:
    applying a weighting function to the overall cell-specific performance indicators of the cells in the candidate set of cells to form weighted overall cell-specific performance indicators of the cells in the candidate set of cells; and
    combining the weighted overall cell-specific performance indicators of the cells in the candidate set of cells to form the performance indicator for the candidate allocation pattern.

13. The method of claim 12, wherein the weighting function comprises a linear function.

14. The method of claim 12, wherein the weighting function comprises a minimum function.

15. The method of claim 11, wherein:
    ascertaining one or more cell-specific performance indicators for each cell in the candidate set of cells comprises ascertaining only one cell-specific performance indicator for each cell in the candidate set of cells; and
    ascertaining the overall cell-specific performance indicator for each of the cells in the candidate set of cells comprises, for each cell in the candidate set of cells, selecting said only one cell-specific performance indicator.

16. The method of claim 11, wherein ascertaining the overall cell-specific performance indicator for each of the cells in the candidate set of cells comprises:
    for each cell in the candidate set of cells, applying a first weighting function to the cell-specific performance indicators of said cell in the candidate set of cells to produce weighted cell-specific performance indicators for said cell in the candidate set of cells; and
    for each cell in the candidate set of cells, combining the weighted cell-specific performance indicators to form the overall cell-specific performance indicator of the cell in the candidate set of cells.

17. The method of claim 16, wherein the first weighting function comprises a linear function.

18. The method of claim 16, wherein the first weighting function comprises a minimum function.

19. The method of claim 16, wherein the first weighting function comprises, for each cell in the candidate set of cells, a function of a signal attenuation level between the cell in the candidate set of cells and a different cell in the candidate set of cells.

20. The method of claim 16, wherein the first weighting function comprises, for each cell in the candidate set of cells, a function of a distance between the cell in the candidate set of cells and a different cell in the candidate set of cells.

21. The method of claim 16, wherein combining the overall cell-specific performance indicators of the cells in the candidate set of cells comprises:
    applying a second weighting function to the overall cell-specific performance indicators of the cells in the candidate set of cells to form weighted overall cell-specific performance indicators of the cells in the candidate set of cells; and
    combining the weighted overall cell-specific performance indicators of the cells in the candidate set of cells to form the performance indicator for the candidate allocation pattern.

22. The method of claim 21, wherein the second weighting function comprises a linear function.

23. The method of claim 21, wherein the second weighting function comprises a minimum function.

24. The method of claim 1, wherein determining the candidate allocation pattern comprises selecting one candidate allocation pattern from all possible candidate allocation patterns.

25. The method of claim 1, wherein determining the candidate allocation pattern comprises selecting one candidate allocation pattern from a set of fewer than all possible candidate allocation patterns.

26. The method of claim 25, wherein the set of fewer than all possible candidate allocation patterns is derived from an allocation pattern that was previously applied to the candidate set of two or more cells.

27. The method of claim 1, further comprising iteratively performing the method of operating the two or more base stations that serve the respective cells in the cellular communication system for different candidate allocation patterns until an allocation pattern that best satisfies the predetermined relationship with the threshold performance value is found.

28. The method of claim 1, further comprising iteratively performing the method of operating the two or more base stations that serve respective cells in the cellular communication system for different candidate allocation patterns until an allocation pattern that at least minimally satisfies the predetermined relationship with the threshold performance value is found.

29. An apparatus for operating two or more base stations that serve respective cells in a cellular communication system, the apparatus comprising:
    a) circuitry configured to determine a candidate allocation pattern of a plurality of primary and secondary synchronization signal sequences for a candidate set of two or more cells that includes the cells served by the base stations;
    b) circuitry configured to apply a performance metric to the candidate allocation pattern to ascertain a performance indicator for the candidate allocation pattern, wherein the performance indicator indicates a quality of positioning performance for the candidate set of two or more cells;
    c) circuitry configured to ascertain whether the performance indicator satisfies a predetermined relationship with a threshold performance value for the candidate set of two or more cells;
    d) circuitry configured to respond to the performance indicator satisfying the predetermined relationship with the threshold performance value for the candidate set of two or more cells by supplying the plurality of primary and secondary synchronization signal sequences to respective ones of base stations corresponding to the two or more cells in accordance with the candidate allocation pattern, and causing each of the two or more base stations to transmit the supplied primary and secondary synchronization signal sequences; and
    e) circuitry configured to respond to the performance indicator not satisfying the predetermined relationship with the threshold performance value for the candidate set of two or more cells by changing the candidate allocation pattern of primary and secondary synchronization signal sequences for the candidate set of two or more cells that includes the cells served by the base stations, and activating the b) and c) circuitry to repeat the applying and ascertaining functions associated with the b) and c) circuitry.

30. The apparatus of claim 29, wherein:
each secondary synchronization signal sequence comprises a first sequence and a second sequence; and
the circuitry configured to apply the performance metric to the candidate allocation pattern comprises:
circuitry configured to ascertain whether any two cells in the candidate set of two or more cells have been allocated a same primary synchronization signal sequence and a same first sequence or whether any two cells in the candidate set of two or more cells have been allocated a same primary synchronization signal sequence and a same second sequence.

31. The apparatus of claim 29, wherein the circuitry configured to apply the performance metric to the candidate allocation pattern comprises circuitry configured to ascertain a degree of correlation between one or both of the primary and secondary synchronization signal sequences of one of the cells in the candidate set of cells and a corresponding one or both of the primary and secondary synchronization signal sequences of another one of the cells in the candidate set of cells.

32. The apparatus of claim 31, wherein the circuitry configured to apply the performance metric to the candidate allocation pattern comprises circuitry configured to ascertain an extent to which the primary and secondary synchronization signal sequences allocated in accordance with the candidate allocation pattern are correlated with one another for the entire candidate set of cells.

33. The apparatus of claim 32, wherein the circuitry configured to ascertain an extent to which primary and secondary synchronization signal sequences allocated in accordance with the candidate allocation pattern are correlated with one another for the entire candidate set of two or more cells comprises:
circuitry configured to ascertain individual correlation results between primary and secondary synchronization signal sequences of pairs of cells in the candidate set of two or more cells;
circuitry configured to test each of the individual correlation results to ascertain whether the individual correlation result exceeds a predefined threshold; and
circuitry configured to count how many of the individual correlation results exceed the predefined threshold.

34. The apparatus of claim 29, wherein the circuitry configured to apply the performance metric to the candidate allocation pattern to ascertain the performance indicator comprises circuitry configured to determine an expected best positioning performance of a user equipment operating in one of the cells served by a corresponding one of the base stations.

35. The apparatus of claim 34, wherein the circuitry configured to determine the expected best positioning performance of the user equipment operating in the cell served by the corresponding one of the base stations includes circuitry configured to determine the expected best positioning performance by taking into account signal attenuation between the cell served by the corresponding one of the base stations and other cells in the candidate set of two or more cells.

36. The apparatus of claim 29, wherein the circuitry configured to apply the performance metric to the candidate allocation pattern to ascertain the performance indicator comprises circuitry configured to determine an expected worst positioning performance of a user equipment operating in one of the cells served by a corresponding one of the base stations.

37. The apparatus of claim 36, wherein the circuitry configured to determine the expected worst positioning performance of the user equipment operating in the cell served by the corresponding one of the base stations comprises circuitry configured to determine the expected worst positioning performance by taking into account signal attenuation between the cell served by the corresponding one of the base stations and other cells in the candidate set of two or more cells.

38. The apparatus of claim 29, wherein the circuitry configured to apply the performance metric to the candidate allocation pattern to ascertain the performance indicator comprises:
circuitry configured to ascertain one or more cell-specific performance indicators for each cell in the candidate set of cells; and
circuitry configured to combine the one or more cell-specific performance indicators of all of the cells in the candidate set of cells to derive the performance indicator for the candidate allocation pattern.

39. The apparatus of claim 38, wherein the circuitry configured to combine the one or more cell-specific performance indicators of all of the cells in the candidate set of cells to derive the performance indicator for the candidate allocation pattern comprises:
circuitry configured to ascertain an overall cell-specific performance indicator for each of the cells in the candidate set of cells; and
circuitry configured to combine the overall cell-specific performance indicators of the cells in the candidate set of cells.

40. The apparatus of claim 39, wherein the circuitry configured to combine the overall cell-specific performance indicators of the cells in the candidate set of cells comprises:
circuitry configured to apply a weighting function to the overall cell-specific performance indicators of the cells in the candidate set of cells to form weighted overall cell-specific performance indicators of the cells in the candidate set of cells; and
circuitry configured to combine the weighted overall cell-specific performance indicators of the cells in the candidate set of cells to form the performance indicator for the candidate allocation pattern.

41. The apparatus of claim 40, wherein the weighting function comprises a linear function.

42. The apparatus of claim 40, wherein the weighting function comprises a minimum function.

43. The apparatus of claim 39, wherein:
the circuitry configured to ascertain one or more cell-specific performance indicators for each cell in the candidate set of cells comprises circuitry configured to ascertain only one cell-specific performance indicator for each cell in the candidate set of cells; and
the circuitry configured to ascertain the overall cell-specific performance indicator for each of the cells in the candidate set of cells comprises circuitry configured to select said only one cell-specific performance indicator for each cell in the candidate set of cells.

44. The apparatus of claim 39, wherein the circuitry configured to ascertain the overall cell-specific performance indicator for each of the cells in the candidate set of cells comprises:
circuitry configured to apply, for each cell in the candidate set of cells, a first weighting function to the cell-specific performance indicators of said cell in the candidate set of cells to produce weighted cell-specific performance indicators for said cell in the candidate set of cells; and circuitry configured to combine, for each cell in the candidate set of cells, the weighted cell-specific performance indicators to form the overall cell-specific performance indicator of the cell in the candidate set of cells.

45. The apparatus of claim 44, wherein the first weighting function comprises a linear function.

46. The apparatus of claim 44, wherein the first weighting function comprises a minimum function.

47. The apparatus of claim 44, wherein the first weighting function comprises, for each cell in the candidate set of cells, a function of a signal attenuation level between the cell in the candidate set of cells and a different cell in the candidate set of cells.

48. The apparatus of claim 44, wherein the first weighting function comprises, for each cell in the candidate set of cells, a function of a distance between the cell in the candidate set of cells and a different cell in the candidate set of cells.

49. The apparatus of claim 44, wherein the circuitry configured to combine the overall cell-specific performance indicators of the cells in the candidate set of cells comprises:
   circuitry configured to apply a second weighting function to the overall cell-specific performance indicators of the cells in the candidate set of cells to form weighted overall cell-specific performance indicators of the cells in the candidate set of cells; and
   circuitry configured to combine the weighted overall cell-specific performance indicators of the cells in the candidate set of cells to form the performance indicator for the candidate allocation pattern.

50. The apparatus of claim 49, wherein the second weighting function comprises a linear function.

51. The apparatus of claim 49, wherein the second weighting function comprises a minimum function.

52. The apparatus of claim 29, wherein the circuitry configured to determine the candidate allocation pattern of first and second secondary synchronization signal sequences for the candidate set of two or more cells comprises circuitry configured to select one candidate allocation pattern from all possible candidate allocation patterns.

53. The apparatus of claim 29, wherein the circuitry configured to determine the candidate allocation pattern of first and second secondary synchronization signal sequences for the candidate set of two or more cells comprises circuitry configured to select one candidate allocation pattern from a set of fewer than all possible candidate allocation patterns.

54. The apparatus of claim 53, wherein the set of fewer than all possible candidate allocation patterns is derived from an allocation pattern that was previously applied to the candidate set of two or more cells.

55. The apparatus of claim 29, wherein the circuitry is further configured to iteratively analyze different candidate allocation patterns until an allocation pattern that best satisfies the predetermined relationship with the threshold performance value is found.

56. The apparatus of claim 29, wherein the circuitry is further configured to iteratively analyze different candidate allocation patterns until an allocation pattern that at least minimally satisfies the predetermined relationship with the threshold performance value is found.

57. A non-transitory processor-readable storage medium having stored thereon a set of program instructions that causes one or more processors to operate two or more base stations that serve respective cells in a cellular communication system, the set of program instructions comprising instructions to cause the one or more processors to:
   a) determine a candidate allocation pattern of a plurality of primary and secondary synchronization signal sequences for a candidate set of two or more cells that includes the cells served by the base stations;
   b) apply a performance metric to the candidate allocation pattern to ascertain a performance indicator for the candidate allocation pattern, wherein the performance indicator indicates a quality of positioning performance for the candidate set of two or more cells;
   c) ascertain whether the performance indicator satisfies a predetermined relationship with a threshold performance value for the candidate set of two or more cells;
   d) if the performance indicator satisfies the predetermined relationship with the threshold performance value for the candidate set of two or more cells, then supply the plurality of primary and secondary synchronization signal sequences to respective ones of base stations corresponding to the two or more cells in accordance with the candidate allocation pattern, and causing each of the two or more base stations to transmit the supplied primary and secondary synchronization signal sequences; and
   e) if the performance indicator does not satisfy the predetermined relationship with the threshold performance value for the candidate set of two or more cells, then change the candidate allocation pattern of primary and secondary synchronization signal sequences for the candidate set of two or more cells that includes the cells served by the base stations, and repeating steps b) and c).

* * * * *

UNITED STATES PATENT AND TRADEMARK OFFICE
CERTIFICATE OF CORRECTION

PATENT NO. : 8,731,573 B2
APPLICATION NO. : 13/319301
DATED : May 20, 2014
INVENTOR(S) : Lindoff et al.

Page 1 of 1

It is certified that error appears in the above-identified patent and that said Letters Patent is hereby corrected as shown below:

In the Specification

In Column 4, Line 22, delete " $S_1 = f(\tilde{S}_1, \tilde{S}_2)$ " and insert -- $S_i = f_i(\tilde{S}_i, \tilde{S}_i)$ --, therefor.

In Column 10, Line 56, delete "s11" and insert -- s1i --, therefor.

Signed and Sealed this
Twenty-first Day of October, 2014

Michelle K. Lee
*Deputy Director of the United States Patent and Trademark Office*